US011133558B2

(12) United States Patent
Tokuno et al.

(10) Patent No.: US 11,133,558 B2
(45) Date of Patent: Sep. 28, 2021

(54) ELECTRODE STRUCTURE AND SECONDARY BATTERY

(71) Applicant: Kabushiki Kaisha Toshiba, Minato-ku (JP)

(72) Inventors: Yoko Tokuno, Yokohama (JP); Ikuo Uematsu, Yokohama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 54 days.

(21) Appl. No.: 16/455,991

(22) Filed: Jun. 28, 2019

(65) Prior Publication Data
US 2020/0006731 A1 Jan. 2, 2020

(30) Foreign Application Priority Data

Jul. 2, 2018 (JP) .............................. JP2018-126109

(51) Int. Cl.
*H01M 50/44* (2021.01)
*H01M 50/411* (2021.01)
*H01M 50/449* (2021.01)
*H01M 50/46* (2021.01)

(52) U.S. Cl.
CPC ......... *H01M 50/44* (2021.01); *H01M 50/411* (2021.01); *H01M 50/449* (2021.01); *H01M 50/461* (2021.01)

(58) Field of Classification Search
None
See application file for complete search history.

(56) References Cited

U.S. PATENT DOCUMENTS

| | | | | |
|---|---|---|---|---|
| 3,704,221 A | * | 11/1972 | McCully | ................. H01M 8/00 204/295 |
| 10,135,050 B2 | | 11/2018 | Uematsu et al. | |
| 2003/0215705 A1 | * | 11/2003 | Kritzer | .................. D06M 23/08 429/144 |
| 2011/0177395 A1 | | 7/2011 | Kamisasa | |
| 2011/0217585 A1 | * | 9/2011 | Wang | ...................... B32B 37/02 429/145 |
| 2015/0093637 A1 | | 4/2015 | Tokuno et al. | |

(Continued)

FOREIGN PATENT DOCUMENTS

| | | |
|---|---|---|
| JP | 4749511 | 8/2011 |
| JP | 2012-227115 A | 11/2012 |
| JP | 2014-167938 | 9/2014 |

(Continued)

*Primary Examiner* — Daniel S Gatewood
(74) *Attorney, Agent, or Firm* — Oblon, McClelland, Maier & Neustadt, L.L.P.

(57) ABSTRACT

According to one embodiment, an electrode structure is provided. The electrode structure includes an electrode and a separator. The electrode includes an active material-containing layer. The separator includes a layer provided on a main surface of the active material-containing layer. The layer includes organic fibers and a resin mass. The resin mass is in contact with a portion of the main surface of the active material-containing layer. The resin mass is integrated with a portion of the organic fibers. When a length of the resin mass is represented by a circumscribed quadrilateral of the resin mass, a length of a first side of the circumscribed quadrilateral and a length of a second side adjacent to the first side are each 10 μm or more.

16 Claims, 12 Drawing Sheets

(56) References Cited

U.S. PATENT DOCUMENTS

2015/0162584 A1* 6/2015 Uematsu ............... H01M 2/162
429/163

FOREIGN PATENT DOCUMENTS

| | | |
|---|---|---|
| JP | 2015-069938 | 4/2015 |
| JP | 2015-069957 | 4/2015 |
| JP | 6012932 | 10/2016 |
| KR | 20150051743 A * | 5/2015 |
| KR | 10-1735510 B1 | 5/2017 |
| KR | 10-1796283 B1 | 11/2017 |
| WO | WO 2018/179613 A1 | 10/2018 |

* cited by examiner

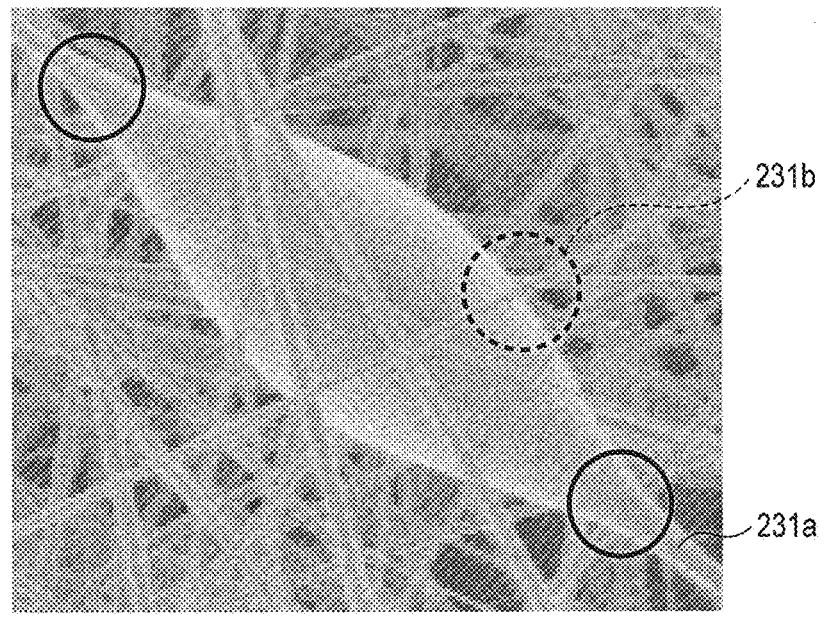
F I G. 15
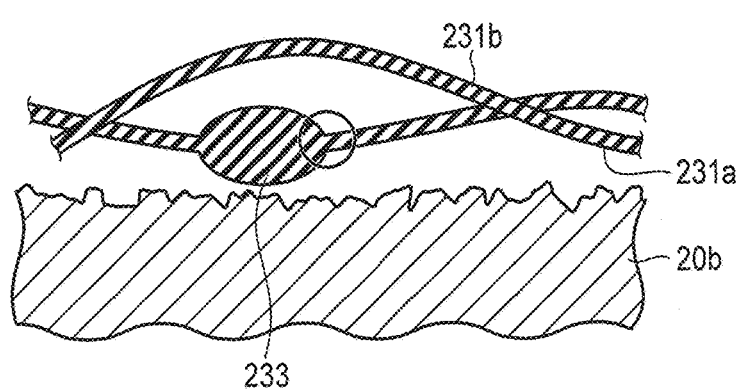
F I G. 16

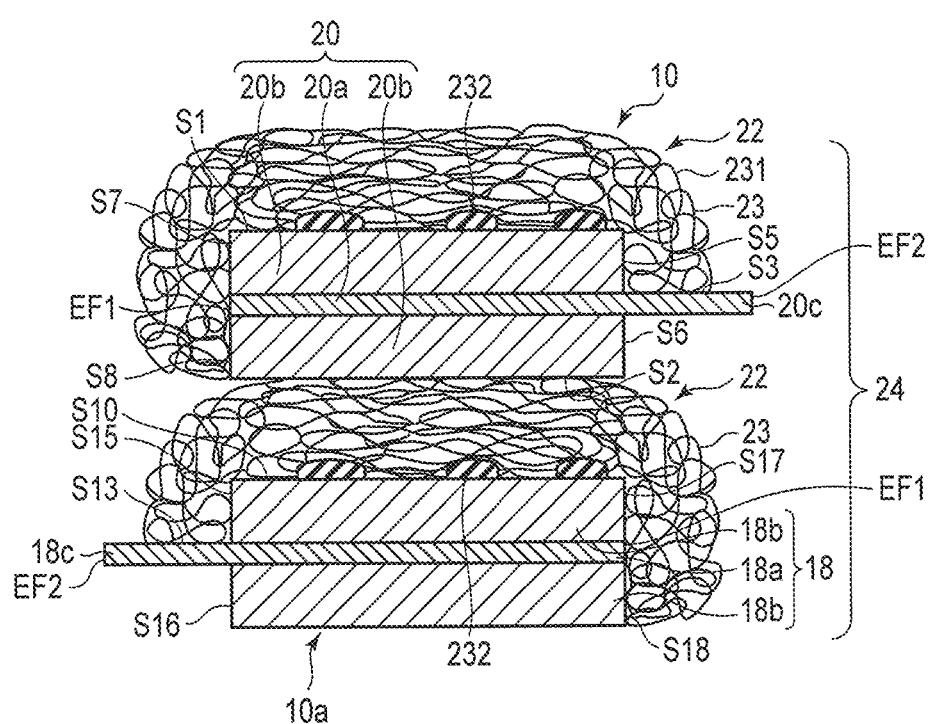
F I G. 20

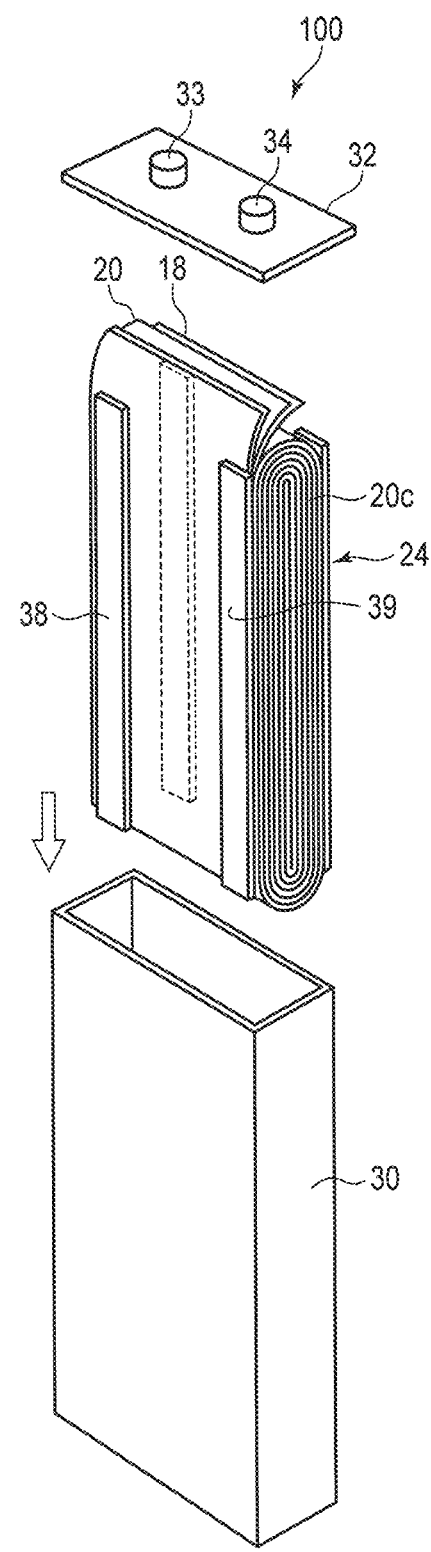
F I G. 21

ELECTRODE STRUCTURE AND SECONDARY BATTERY

CROSS REFERENCE TO RELATED APPLICATIONS

This application is based upon and claims the benefit of priority from Japanese Patent Application No. 2018-126109, filed Jul. 2, 2018, the entire contents of which is incorporated herein by reference.

FIELD

Embodiments described herein relate generally to an electrode structure and a secondary battery.

BACKGROUND

In a secondary battery such as a lithium ion secondary battery, a porous separator is used so as to avoid a contact between a positive electrode and a negative electrode. Usually, a separator is prepared as a self-supporting film separately from an electrode body (the positive electrode and the negative electrode). The separator is disposed between the positive electrode and the negative electrode to form an electrode group, and this is wound or stacked to constitute a battery.

Examples of a general separator include a porous film made of a polyolefin resin film. Such a separator is produced, for example, by extruding a melt containing a polyolefin-based resin composition into a sheet, extracting and removing a substance other than the polyolefin-based resin, and stretching the sheet.

However, since it is necessary for a separator made of a resin film to have mechanical strength so as not to break during production of a battery, it is difficult to make the separator thin beyond a certain extent. Therefore, when the separator made of the resin film is used, it is difficult to improve the volumetric energy density of the battery. In addition, when the thickness or density of the separator is excessively large, rapid movement of lithium ions between the electrodes may be inhibited, and the input and output performance of the battery may be deteriorated.

Therefore, it has been proposed to use organic fiber deposits as the separator instead of the separator made of the resin film. Such organic fiber deposits do not need the mechanical strength. For this reason, the film thickness of the separator made of such organic fiber deposits can be made smaller than the film thickness of the self-supporting film type separator.

However, in a case in which the organic fiber deposit is used as the separator instead of the separator made of the resin film, the internal short circuit may occur when a portion of the organic fiber deposits is peeled off from a main surface or an end portion of an active material-containing layer or an electrode tab.

BRIEF DESCRIPTION OF THE DRAWINGS

FIG. 15 is an electron microscope photograph showing an example of the organic fibers-including layer containing the bead;

FIG. 16 is a cross-sectional view schematically showing an example of the bead;

FIG. 20 is a cross-sectional view schematically showing still another example of the electrode group;

FIG. 21 is an exploded perspective view showing an example of a secondary battery according to one embodiment.

DETAILED DESCRIPTION

Figure 1:
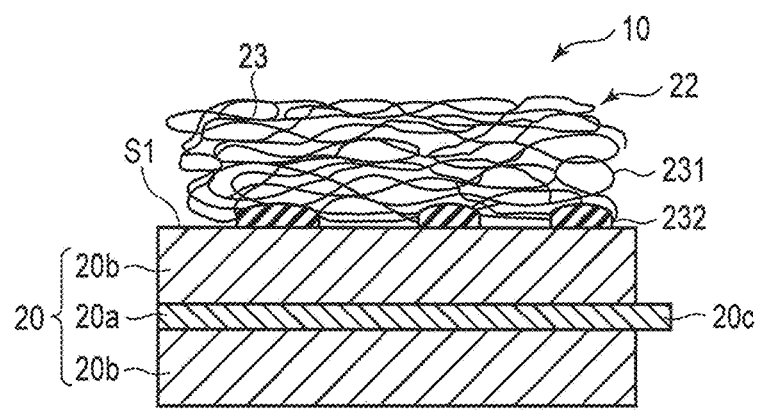
FIG. 1 is a cross-sectional view schematically showing an example of an electrode structure according to one embodiment.

According to one embodiment, an electrode structure is provided. The electrode structure includes an electrode and a separator. The electrode includes an active material-containing layer. The separator includes a layer provided on a main surface of the active material-containing layer. The layer includes organic fibers and a resin mass. The resin mass is in contact with a portion of the main surface of the active material-containing layer. The resin mass is integrated with a portion of the organic fibers. When a length of the resin mass is represented by a circumscribed quadrilateral of the resin mass, a length of a first side of the circumscribed quadrilateral and a length of a second side adjacent to the first side are each 10 μm or more.

According to another embodiment, a secondary battery is provided. The secondary battery includes the electrode structure according to the embodiment, an electrode facing the electrode structure, and an electrolyte.

First Embodiment

An electrode structure according to a first embodiment includes an electrode and a separator. The electrode includes an active material-containing layer. The separator includes a layer provided on a main surface of the active material-containing layer. The layer includes organic fibers and a resin mass. The resin mass is in contact with a portion of the main surface of the active material-containing layer. The resin mass is integrated with a portion of the organic fibers. When a length of the resin mass is represented by a circumscribed quadrilateral of the resin mass, a length of a first side of the circumscribed quadrilateral and a length of a second side adjacent to the first side are each 10 µm or more.

The organic fibers-including layer of the electrode structure according to one embodiment includes a resin mass having a relatively large breadth (first side or second side) of 10 µm or more. The resin mass is deposited on a portion of the main surface of the active material-containing layer in a state of being integrated with a portion of the surrounding organic fibers. When the organic fibers-including layer contains such a resin mass, the area of the organic fibers-including layer in contact with the active material-containing layer is increased. Therefore, when the organic fibers-including layer containing such a resin mass, for example, even when static electricity is generated on the contact surface of the electrode structure and a conveying roll in a process of manufacturing the secondary battery, or even when a large impact is applied to the electrode structure, the organic fibers-including layer is less likely to be peeled off from the end portion of the active material-containing layer or the electrode tab. Therefore, when the electrode structure provided with the organic fibers-including layer containing such a resin mass is used, the internal short circuit of the secondary battery can be suppressed.

Hereinafter, the electrode structure according to one embodiment will be described in detail with reference to the drawings.

Figure 2:
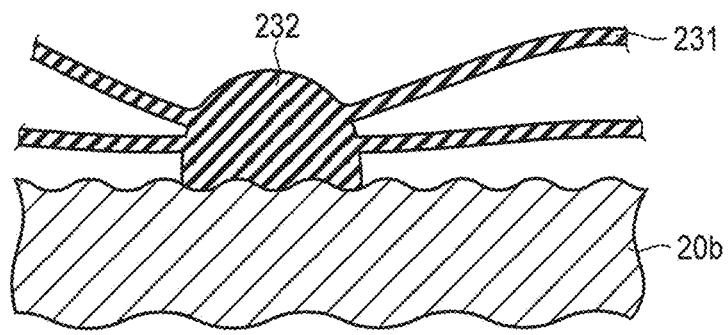
FIG. 2 is an enlarged cross-sectional view showing a portion of the electrode structure shown in FIG. 1.

FIG. 1 is a cross-sectional view schematically showing an example of an electrode structure according to one embodiment. FIG. 2 is an enlarged cross-sectional view showing a portion of the electrode structure shown in FIG. 1. The electrode structure 10 shown in FIG. 1 includes an electrode 20 and a separator 22.

(Electrode)

The electrode 20 shown in FIG. 1 includes a current collector 20a, an active material-containing layer 20b, and an electrode tab 20c. The active material-containing layer 20b is provided on both sides of the current collector 20a. The electrode tab 20c is a part of the current collector 20a which is not provided with the active material-containing layer 20b and which protrudes from one side of the active material-containing layer 20b. The active material-containing layer 20b may be provided on one side of the current collector 20a.

The electrode 20 may be a negative electrode or a positive electrode. That is, the electrode structure according to the first embodiment may be a negative electrode structure or a positive electrode structure. Hereinafter, details of the negative electrode and the positive electrode will be described.

(Negative Electrode)

(Negative Electrode Current Collector and Tab)

Examples of the negative electrode current collector include a foil made of a conductive material. Examples of the conductive material include aluminum or an aluminum alloy.

The negative electrode tab is preferably made of the same material as the negative electrode current collector. The negative electrode tab may be provided by preparing a metal foil separately from the negative electrode current collector and connecting the metal foil to the negative electrode current collector by welding or the like.

(Negative Electrode Active Material-Containing Layer)

The negative electrode active material-containing layer may be formed on both sides of the negative electrode current collector, but can also be formed on only one side of the negative electrode current collector.

The negative electrode active material-containing layer contains particles of the negative electrode active material. Therefore, the main surface of the active material-containing layer may have minute unevenness.

As the negative electrode active material, carbon materials including graphite or the like, tin-silicon-based alloy materials, and the like can be used, but lithium titanate is preferably used. In addition, lithium titanate or titanium oxide containing other metals such as niobium (Nb) can also be used as the negative electrode active material. Examples of lithium titanate include $Li_{4+x}Ti_5O_{12}$ (0≤x≤3) having a spinel structure or $Li_{2+y}Ti_3O_7$ (0≤y≤3) having a ramsdellite structure. The kind of the negative electrode active material may be one kind or two or more kinds.

The average particle size of the primary particles of the negative electrode active material is preferably in the range of 0.001 µm to 1 µm. The average particle size can be obtained by, for example, observing the negative electrode active material with a scanning electron microscope (SEM). The particle shape may be granular or fibrous. In the case of the fibrous shape, the fiber diameter is preferably 0.1 µm or less. Specifically, the average particle size of the primary particles of the negative electrode active material can be measured from an image observed with an SEM. When lithium titanate having an average particle size of 1 µm or less is used as the negative electrode active material, a negative electrode active material-containing layer having high surface flatness can be obtained. In addition, when lithium titanate is used, a negative electrode potential is nobler than that of a lithium ion secondary battery using a common carbon negative electrode. Therefore, precipitation of lithium metal does not occur in principle. The negative electrode active material containing lithium titanate can be prevented from collapsing the crystal structure of the active material because the expansion and contraction associated with the charge-and-discharge reaction is small.

The negative electrode active material-containing layer may contain at least one of a conductive agent and a binder in addition to the negative electrode active material.

Examples of the conductive agent can include acetylene black, carbon black, graphite, or a mixture thereof.

Examples of the binder include polytetrafluoroethylene (PTFE), polyvinylidene fluoride (PVdF), fluorine-containing rubber, styrene-butadiene rubber, and mixtures thereof.

(Positive Electrode)

(Positive Electrode Current Collector and Tab)

Examples of the positive electrode current collector include a foil made of a conductive material. Examples of the conductive material include aluminum and an aluminum alloy.

The positive electrode tab is preferably made of the same material as the positive electrode current collector. The positive electrode tab may be provided by preparing a tab separately from the positive electrode current collector and connecting the tab to the positive electrode current collector by welding or the like.

(Positive Electrode Active Material-Containing Layer)

The positive electrode active material-containing layer may be formed on both sides of the positive electrode current collector, but can also be formed on only one side of the positive electrode current collector.

The positive electrode active material-containing layer contains particles of the positive electrode active material. Therefore, as shown in FIG. 2, the main surface of the active material-containing layer 20b may have minute unevenness.

As the positive electrode active material, for example, a lithium transition metal composite oxide can be used. For example, there are $LiCoO_2$, $LiNi_{1-x}Co_xO_2$ (0<x<0.3), $LiMn_xNi_yCo_zO_2$ (0<x<0.5, 0<y<0.5, 0≤z<0.5), $LiMn_{2-x}M_xO_4$ (M is at least one element selected from the group consisting of Mg, Co, Al, and Ni, 0<x<0.2), $LiMPO_4$ (M is at least one element selected from the group consisting of Fe, Co, and Ni), and the like.

The positive electrode active material-containing layer may contain at least one of a conductive agent and a binder in addition to the positive electrode active material. As the binder and the conductive agent, the same materials as described in the negative electrode active material-containing layer can be used.

(Separator)

The separator 22 shown in FIG. 1 includes an organic fibers-including layer 23. The separator 22 preferably includes only the organic fibers-including layer 23.

(Organic Fibers-Including Layer)

As shown in FIGS. 1 and 2, the organic fibers-including layer 23 includes a plurality of organic fibers 231 and a resin mass 232. The organic fibers-including layer 23 shown in FIG. 1 is provided on the main surface S1 of one active material-containing layer 20b among the active material-containing layers 20b provided on both surfaces of the current collector 20a. The organic fibers-including layer 23 may also be provided on the main surface S2 of the other active material-containing layer 20b. The organic fibers-including layer 23 may be provided on the side surface of the active material-containing layer 20b or on the tab 20c.

The organic fibers-including layer 23 may have a three-dimensional network structure in which the plurality of organic fibers 231 intersect with each other in a mesh pattern.

The organic fibers-including layer 23 preferably entirely covers the main surface S1 of the active material-containing layer 20b. That is, in main surface S1 of the active material-containing layer 20b covered with the organic fibers-including layer 23, it is preferred that there is almost no exposed part exceeding a diameter of 0.1 mm. A ratio of the area of the portion not coated with the organic fibers-including layer 23 to the area of the main surface S1 of the active material-containing layer 20b, that is, an electrode exposure area ratio is preferably 5% or less, and more preferably 0%.

Note that the electrode exposure area ratio can be obtained by, for example, a digital microscope.

Specifically, first, the electrode is observed at a magnification of 250 times by using a digital scope. Next, image processing is performed on an observation image of 14 $mm^2$ by a color extraction method. Therefore, the ratio of the portion that is not covered with the organic fibers in the main surface of the active material-containing layer can be calculated.

The organic fibers-including layer 23 has pores and the average pore diameter of the pores is preferably 5 nm to 10 μm. In addition, the porosity is preferably 10% to 90%. If such pores are provided, a separator having excellent ion permeability and excellent electrolyte impregnating property can be obtained. The porosity is preferably 40% or more, and more preferably 70% or more. The average pore diameter and the porosity of the pores can be confirmed by a mercury intrusion technique, calculation from volume and density, SEM observation, scanning ion microscope (SIM) observation, or gas desorption method. The porosity is preferably calculated from the volume and the density of the organic fibers-including layer 23. In addition, it is preferable to measure the average pore size by a mercury intrusion technique or a gas desorption technique. The high porosity of the organic fibers-including layer 23 means that the influence of interfering ion migration is small.

In the organic fibers-including layer 23, if the contained organic fibers 231 are in a sparse state, the porosity is increased, and thus it is not difficult to obtain a layer having, for example, a porosity of about 90%. It is extremely difficult to form such a layer having a large porosity with particles.

The thickness of the organic fibers-including layer 23 is, for example, 50 μm or less, preferably 10 μm or less, and more preferably 5 μm or less. When the organic fibers-including layer 23 is thin, the volumetric energy density of the secondary battery can be increased. On the other hand, when the organic fibers-including layer 23 is excessively thin, self discharge or the internal short circuit in the secondary battery easily occurs. The thickness of the organic fibers-including layer 23 is preferably 0.3 μm or more, and more preferably 1 μm or more.

The organic fibers-including layer 23 is advantageous over inorganic fiber deposits in terms of unevenness, susceptibility to cracking, electrolytic solution resistance, adhesion, bending properties, porosity, and ion permeability.

A mass of the organic fibers-including layer 23 per unit area is preferably 0.1 $g/m^2$ to 20 $g/m^2$, and more preferably 0.5 $g/m^2$ to 5 $g/m^2$.

(Organic Fibers)

The organic fibers 231 include, for example, at least one organic material selected from the group consisting of polyamideimide (PAI), polyether imide (PEI), polyimide (PI), polyamide (PA), polyvinylidene fluoride (PVdF), polyethylene, polypropylene, polytetrafluoroethylene (PTFE), polyphenylene sulfide (PPS), liquid crystalline polyester (LCP), polyether sulfone (PES), polyether ketone (PEK), polyether ether ketone (PEEK), polyethylene terephthalate (PET), cellulose, polyolefin, polyketone, polysulfone, cellulose, and polyvinyl alcohol (PVA).

Examples of the polyolefin include polypropylene (PP) and polyethylene (PE). It is generally considered that PVdF and PI are difficult materials to be in the form of fibers. When an electrospinning method described later is employed, such materials can also form a layer as the form of fibers. The kind of the organic material of the organic fibers 231 can be one kind or two or more kinds. Preferable examples include at least one kind selected from the group consisting of polyamide, polyimide, polyamideimide, cellulose, PVdF, and PVA, and more preferable examples include at least one selected from the group consisting of polyamide, polyimide, polyamideimide, and PVdF.

In particular, the organic fibers 231 containing at least one of polyamideimide and polyimide are insoluble or infusible at 250° C. to 400° C. and does not decompose. The organic fibers-including layer 23 having excellent heat resistance can be obtained.

The length of the organic fiber 231 is preferably 1 mm or more. In addition, the average diameter of the cross sections perpendicular to the length direction of the organic fibers 231 is preferably 2 µm or less, and more preferably 1 µm or less. An example of a lower limit value of the average diameter of the organic fibers 231 is 0.05 µm. The organic fibers-including layer 23 including the organic fibers 231 having a sufficient length and a small average diameter has sufficient strength, porosity, air permeability, pore size, electrolytic solution resistance, redox resistance, and the like, the organic fibers including layer 23 functions well as the separator. The length and the average diameter of the organic fibers 231 can be measured by SEM observation.

Cation exchange groups are preferably present on the surfaces of the organic fibers 231. The movement of ions such as lithium ions passing through the separator is promoted by the cation exchange groups, thereby improving the performance of the battery. Specifically, rapid charge and rapid discharge can be performed for a long period of time. The cation exchange groups are not particularly limited, but examples thereof include a sulfonic acid group and a carboxylic acid group. Fibers having the cation exchange groups on the surfaces thereof can be formed by, for example, an electrospinning method using a sulfonated organic material. Details of the electrospinning method will be described later.

(Resin Mass)

At least a portion of the resin mass 232 is in contact with the active material-containing layer 20b. The fact that the resin mass is in contact with the active material-containing layer 20b can be confirmed by SIM observation after focused ion beam (FIB) processing.

Figure 3:
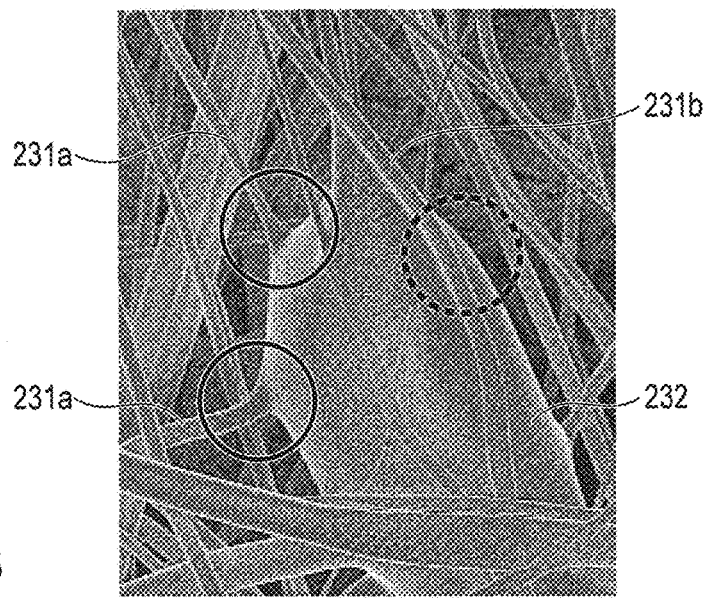
FIG. 3 is a scanning electron microscope photograph of an example of the electrode structure according to one embodiment.
Figure 4:
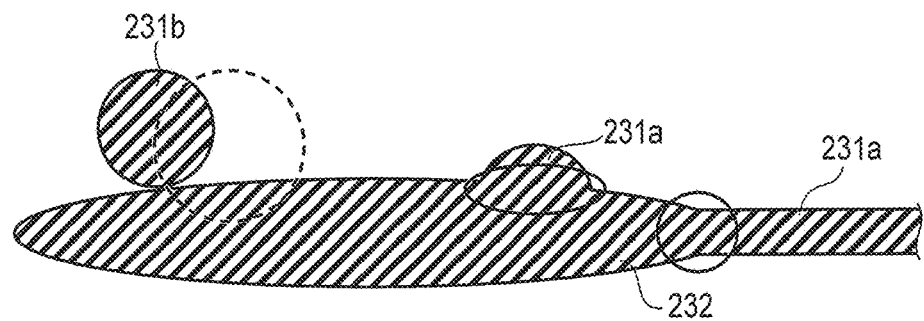
FIG. 4 is a cross-sectional view schematically showing an example of the resin mass.

In addition, the resin mass 232 is integrated with the plurality of organic fibers 231. This integration will be described in more detail with reference to FIGS. 3 and 4. FIG. 3 is a scanning electron microscope photograph of an example of the electrode structure according to one embodiment. FIG. 4 is a cross-sectional view schematically showing an example of the resin mass.

The scanning electron microscope (SEM) photograph shown in FIG. 3 and the schematic view shown in FIG. 4, a resin mass 232, organic fibers 231a integrated with the resin mass 232, and an organic fiber 231b not integrated with the resin mass 232 are shown. Each part surrounded by solid line in FIGS. 3 and 4 is boundary part between the resin mass 232 and the organic fiber 231a. In addition, a part surrounded by a dashed line in FIG. 3 and FIG. 4 is a boundary part between the resin mass 232 and the organic fiber 231b. As shown in FIGS. 3 and 4, each boundary part between the resin mass 232 and the organic fiber 231a is continuously connected, and no boundary line, that is, no edge structure exists. On the other hand, as shown in FIG. 3 and FIG. 4, the boundary part between the resin mass 232 and the organic fiber 231b is not continuous, an edge structure exists, and the organic fiber 231b is deposited on the resin mass 232.

Therefore, it is considered that the boundary line is not seen at the boundary part between the resin mass 232 and each of the organic fibers 231a in the SEM photograph due to the following reason. That is, a portion of each of the organic fibers 231a is melted into the resin mass 232. Therefore, each boundary part is less likely to be charged at the time of SEM observation. As a result, in the SEM photograph, it is considered that a contrast at each boundary part between the resin mass 232 and the organic fiber 231a becomes low and each boundary line is less likely to exist.

On the other hand, it is considered that the edge structure is observed at the boundary part between the resin mass 232 and the organic fiber 231b due to the following reason. That is, the organic fiber 231b is not melted in the resin mass 232 but exists independently from the resin mass 232. Therefore, the boundary part is likely to be charged at the time of SEM observation. As a result, in the SEM photograph, it is considered that a contrast at the boundary part between the resin mass 232 and the organic fiber 231b becomes high and the boundary line is showed clearly.

The SEM photograph can be obtained by, for example, the following method. First, the battery is disassembled and the electrode structure is extracted. Next, the electrode structure is washed with an organic solvent such as ethylene carbonate (EC), dimethyl carbonate (DMC), ethyl methyl carbonate (EMC), or diethyl carbonate (DEC), and is vacuum-dried to obtain the measurement sample. Next, SEM observation is performed on the organic fibers-including layer 23 of the measurement sample. As the SEM, for example, S-5500 manufactured by Hitachi High-Tech Co., Ltd. can be used. For SEM observation, for example, the magnification is set to 1,000 times to 200,000 times. The resin mass 232 has a breadth of 10 µm or more.

Therefore, the length of one side of the circumscribed quadrilateral of the resin mass 232 and the length of the side adjacent to the one side are each 10 µm or more. Here, the breadth of the resin mass 232 means the arithmetic mean value of the breadth of the circumscribed quadrilateral obtained when observing the resin mass 232 with a digital microscope. The circumscribed quadrilateral includes a circumscribed rectangular parallelepiped and a circumscribed rectangle. The breadth will be described in more detail with reference to FIGS. 5 and 6.

Figure 5:
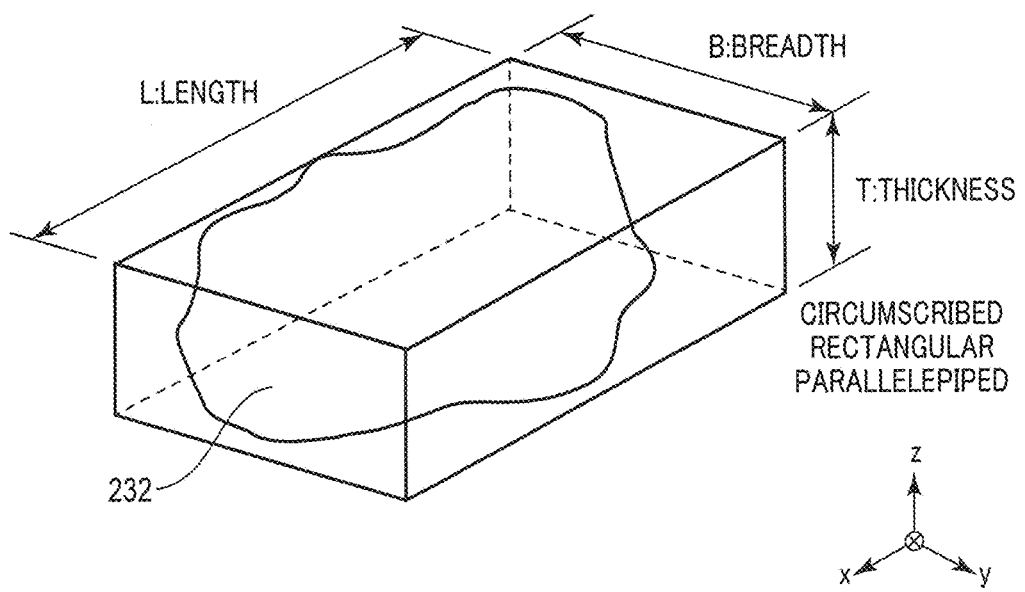
FIG. 5 is a perspective view schematically showing an example of the resin mass contained in the circumscribed rectangular parallelepiped.
Figure 6:
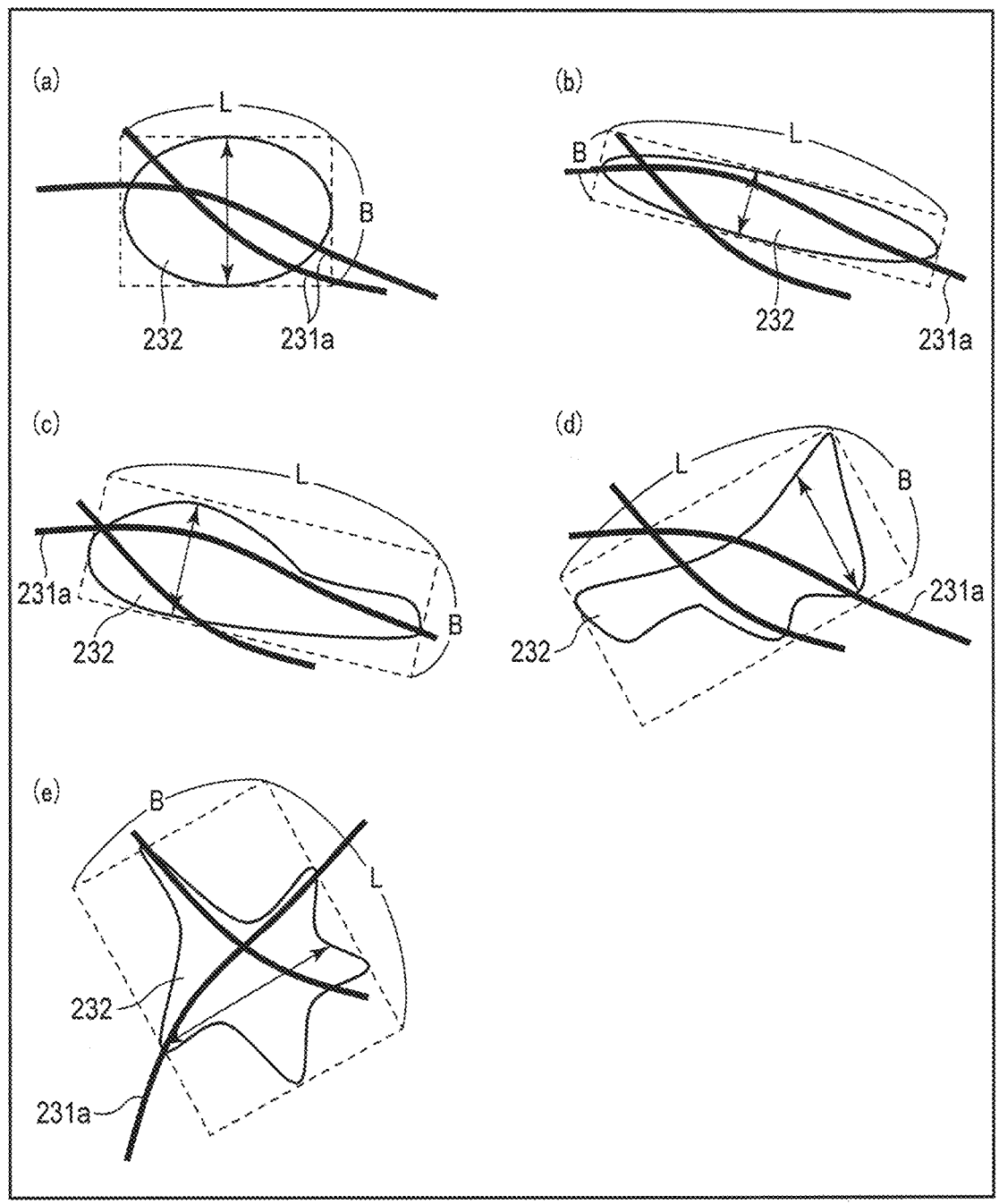
FIG. 6 is a cross-sectional view schematically showing a plural of example of the resin mass.

First, FIG. 5 is a perspective view schematically showing an example of the resin mass contained in the circumscribed rectangular parallelepiped. The circumscribed rectangular parallelepiped shown in FIG. 5 is a rectangular parallelepiped in which each of six faces is in contact with a portion of the contour of the resin mass 232. Note that the x axis, the y axis, and the z axis shown in FIG. 5 are orthogonal to each other. In addition, when a plurality of circumscribed rectangular parallelepipeds of the resin mass 232 are obtained, it is preferable that the circumscribed rectangular parallelepiped having the smallest volume is selected.

As shown in FIG. 5, in the circumscribed rectangular parallelepiped, the length of the side parallel to the x-axis is the length L, the length of the side parallel to the y-axis is the breadth B, and the length of the side parallel to the z axis is the thickness T. The magnitude of the length L is equal to or greater than the breadth B and equal to or greater than the thickness T. In addition, the magnitude of the breadth B is equal to or greater than the thickness T. The circumscribed rectangular parallelepiped may be a circumscribed cube. The breadth of the resin mass 232 means the length of the breadth B of the circumscribed rectangular parallelepiped.

That is, each surface of the circumscribed rectangular parallelepiped of the resin mass 232 can be said to be a circumscribed rectangle of the resin mass 232. In one circumscribed rectangle of the resin mass 232 among these circumscribed rectangles in which the length of one side is the length L and the length of the side adjacent to the one side is the breadth B, the magnitude of the length L is 10 μm or more, and the magnitude of the breadth B is 10 μm or more.

The circumscribed rectangular parallelepiped of the resin mass 232 can be obtained by a digital microscope. Specifically, first, the measurement sample is obtained in the same manner as described in the SEM observation of the resin mass 232. The measurement sample is collected from a middle portion of the active material-containing layer. The middle portion is a region excluding each of the quarter regions from both end faces of the active material containing-layer in the short side direction and each of the quarter regions from both end faces of the active material containing-layer in the long side direction among the main surfaces of the active material-containing layer. Next, the organic fibers-including layer 23 of the measurement sample is observed by using a digital microscope, and three-dimensional images are obtained for five randomly selected resin masses. The measurement magnification is 250 times, and the observation range is 14 mm². By performing image analysis on the three-dimensional images, the circumscribed rectangular parallelepiped of the resin mass 232 is extracted. Next, the arithmetic mean value of the breadths B of the circumscribed rectangular parallelepipeds of the five resin masses is taken as the breadth B of the resin mass 232. As the digital microscope, for example, VHX-5000 manufactured by KEYENCE Corporation can be used.

When calculating the breadth B of the resin mass 232, the circumscribed rectangle may be used instead of the circumscribed rectangular parallelepiped. That is, two-dimensional images may be used as the images obtained by the digital microscope for the resin mass 232. Examples of such two-dimensional images are shown in FIGS. 6A to 6E. FIGS. 6A to 6E are cross-sectional views schematically showing a plurality of examples of the resin mass. Each of the resin masses 232 shown in FIGS. 6A to 6E is integrated with two organic fibers 231a. In the circumscribed rectangles of the resin masses 232 shown in FIGS. 6A to 6E, the length of the long side is the length L of the circumscribed rectangle, and the length of the short side is the breadth B of the circumscribed rectangle. The breadth B of the circumscribed rectangle is used as the breadth B of the resin mass 232. Note that the length L and the breadth B may be equal. That is, the circumscribed rectangle of the resin mass 232 may be a circumscribed square.

Here, the circumscribed rectangle means a rectangle in which each of four sides is in contact with a portion of the contour of the resin mass 232. In addition, when a plurality of circumscribed rectangles of the resin mass 232 are obtained, it is preferable that the circumscribed rectangles having the smallest area is selected.

From the viewpoint of enhancing the adhesion between the organic fibers-including layer 23 and the active material-containing layer 20b, the breadth B of the resin mass 232 is preferably large. When the breadth B of the resin mass 232 is large, the contact area between the organic fibers-including layer 23 and the active material-containing layer 20b is increased. Therefore, the breadth B of the resin mass 232 is preferably 10 μm or more, and more preferably 20 μm or more.

From the viewpoint of enhancing the performance of the secondary battery, the breadth B of the resin mass 232 is preferably not too large. If the breadth B of the resin mass 232 is excessively large, the movement of lithium ions and the like between the electrodes is hindered, leading to an increase in the distance between the electrodes. Therefore, the battery performance may be deteriorated. The breadth B of the resin mass 232 is preferably 100 μm or less, and more preferably 60 μm or less.

The length L of the resin mass 232 is preferably 10 μm to 100 μm, and more preferably 20 μm to 80 μm. In addition, the thickness T of the resin mass 232 is preferably 0.3 μm to 50 μm, and more preferably 1 μm to 20 μm. When the length L or the thickness T of the resin mass 232 is large, the adhesion between the organic fibers-including layer 23 and the active material-containing layer 20b is enhanced. On the other hand, when the length L or the thickness T of the resin mass 232 is too large, the evaporation of the organic solvent contained in the resin mass is hindered, and the battery performance may be deteriorated.

As illustrated in FIGS. 5 and 6A to 6E, the shape of the resin mass 232 is not particularly limited. The resin mass 232 may have a spherical shape, a disk shape, an indeterminate shape, a grain shape, a drop shape, or fine particle-shape. From the viewpoint of enhancing the adhesion between the organic fibers-including layer 23 and the active material-containing layer 20b, the resin mass 232 preferably has a flat shape. The resin mass may have one or more shape. For example, the shape of the resin mass may be small and spherical shape.

The resin mass 232 is preferably positioned in the concave portion of the active material-containing layer 20b. When at least a portion of the resin mass 232 is buried in a portion of the surface of the active material-containing layer 20b, the adhesion between the organic fibers-including layer 23 and the active material-containing layer 20b tends to be further enhanced. The depth of the concave portion of the active material-containing layer 20b may be larger than the thickness T of the resin mass 232, may be equal to thickness T of the resin mass 232, or may be smaller than the thickness T of the resin mass 232. The depth of the concave portion of the active material-containing layer 20b is, for example, 0.3 μm to 50 μm.

Figure 7:
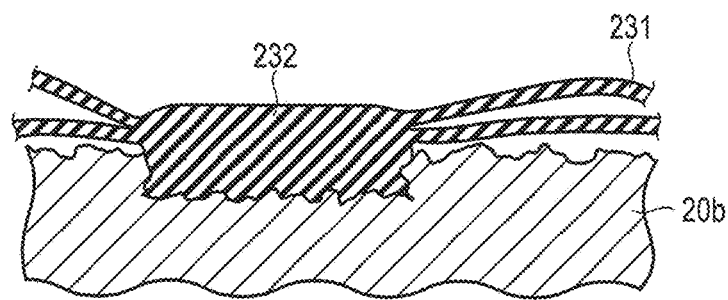
FIG. 7 is an enlarged cross-sectional view schematically showing a portion of the electrode structure after the press process.

The resin mass 232 positioned in the concave portion of the active material-containing layer 20b can be obtained by, for example, performing a press process on the organic fibers-including layer 23 provided on the active material-containing layer 20b. FIG. 7 is an enlarged cross-sectional view schematically showing a portion of the electrode structure after the press process. A portion of the resin mass 232 shown in FIG. 7 is embedded in the surface of the active material-containing layer 20b. As shown in FIG. 7, the resin mass 232 after the press process has a flatter shape than the resin mass 232 shown in FIG. 2. The thickness T of the resin mass 232 or the depth of the concave portion of the active material-containing layer 20b can be adjusted by conditions of the press process. Details of the press process will be described later.

The resin mass 232 positioned in the concave portion of the active material-containing layer 20b can also be formed by discharging a raw material solution of the resin mass 232 toward the concave portion of the active material-containing layer 20b. Details of the method of forming the resin mass 232 will be described later.

Figure 8:
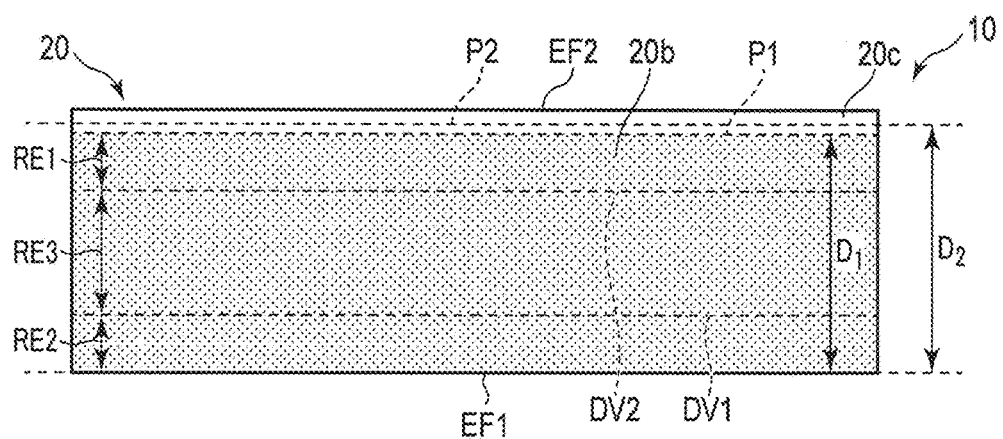
FIG. 8 is a plan view of the main surface of the active material-containing layer of the electrode structure shown in FIG. 1, when viewed from directly above.

The resin mass 232 may be present at any position on the main surface of the active material-containing layer 20b. The position of the resin mass 232 on the active material-containing layer 20b will be described in more detail with reference to FIG. 8. FIG. 8 is a plan view of the main surface of the active material-containing layer of the electrode structure shown in FIG. 1, when viewed from directly above. In the electrode structure 10 shown in FIG. 8, the organic fibers-including layer 23 is omitted. The current collector 20a included in the electrode 20 shown in FIG. 8 has a first end face EF1 and a second end face EF2 facing the first end face EF1 in the long side direction. The active material-containing layer 20b is provided so as to be parallel to the long side direction of the current collector 20a from the first end face EF1 to a point P1 positioned between the first end face EF1 and the second end face EF2. The portion of the current collector 20a which is from the position P1 to the second end face EF2 functions as the electrode tab 20c.

The main surface of the active material-containing layer 20b is divided into first to third regions by dividing lines DV1 and DV2 parallel to the long side direction of the active material-containing layer 20b. A second region RE2 is a region sandwiched between the dividing line DV1 and the first end face EF1, and the area thereof occupies a quarter of the area of the main surface of the active material-containing layer 20b. A first region RE1 is a region sandwiched between the dividing line DV2 and a line passing through the point P1 and parallel to the long side direction, and the area thereof occupies a quarter of the area of the main surface of the active material-containing layer 20b. A third region RE3 is a region between the first region RE1 and the second region RE2, and the area thereof occupies a half of the area of the surface of the active material-containing layer 20b.

Although not shown in FIG. 8, the organic fibers-including layer 23 covers the entire main surface of the active material-containing layer 20b and a portion of the electrode tab 20c. The organic fibers-including layer 23 is provided so as to be parallel to the long side direction of the current collector 20a from the first end face EF1 to a position P2 between the position P1 and the second end face EF2. The length of a distance D2 from the first end face EF1 to the position P2 is preferably longer than a distance $D_1$ from the first end face EF1 to the position P1.

The resin mass 232 is present in any one or more of the first to third regions. The resin mass 232 may be present in all of the first to third regions. In addition, the resin mass 232 may exist in a region between a line parallel to the long side direction of the active material-containing layer 20b through the position P1 and a line parallel to the long side direction of the active material-containing layer 20b through the position P2, that is, the tab 20c.

The resin mass 232 is preferably present in at least one of the first and second regions. That is, when the resin mass 232 is present at the end portion (first and second regions) parallel to the long side direction of the active material-containing layer 20b, the internal short circuit of the secondary battery is less likely to occur, as compared with a case in which the resin mass 232 is present only in the central portion (third region) of the active material-containing layer. This is because peeling of the organic fibers-including layer 23 from the active material-containing layer 20b is more likely to occur at the end, as compared with the central portion.

In the central portion (third region) of the main surface of active material-containing layer 20b, an area ratio A1 occupied by the area of the resin mass 232 is preferably 0.3% or more, and more preferably 0.8% or more. When the area ratio A1 is high, the adhesion between the organic fibers-including layer 23 and the active material-containing layer 20b tends to be enhanced. However, when the area ratio A1 is too high, the movement of lithium ions and the like between the electrodes is hindered, which deteriorates the battery performance. Therefore, the area ratio A1 is preferably 10% or less, more preferably 5% or less, and still more preferably 3.5% or less.

This ratio can be obtained by, for example, the following method. First, the electrode structure is removed from the battery to obtain the measurement sample in the same manner as described above. Next, the organic fibers-including layer 23 positioned in the central portion of the active material-containing layer 20b of the measurement sample is observed by using an optical microscope. When the resin mass 232 is made of a coloring material, the area ratio A1 can be obtained by performing image processing on the observation image by a color extraction method. That is, when the resin mass 232 is made of the coloring material, since the resin mass 232 is an aggregate of the coloring material, the contrast may look different as compared with other portions. Therefore, the total value of the areas calculated from the contour of the particulate matter extracted by the color extraction method can be used as the area of the resin mass 232. The area ratio A1 can be obtained from this area.

In addition, when the resin mass 232 does not contain the coloring material, the area ratio A1 can be obtained by contour-extracting the particulate matter from the image obtained by the SEM or the optical microscope. When the resin mass 232 and the organic fiber 231 are made of different materials, elemental mapping is preferably used in combination in the contour extraction of the resin mass 232.

In the observation image obtained by the SEM or the optical microscope, when it is difficult to distinguish between the resin mass 232 and the organic fiber 231, or when it is difficult to extract the contour of the resin mass 232, the area ratio A1 can be obtained by considering all particulate matters present in five arbitrarily selected observation ranges as ellipses and calculating the area from the major axis and the minor axis of each ellipse.

In at least one of the end portions (first or second region) of the main surface of the active material-containing layer 20b, an area ratio A2 occupied by the area of the resin mass 232 is preferably 0.4% or more, more preferably 1.0% or more, and still more preferably 1.5% or more. When the area ratio A2 is high, the adhesion between the organic fibers-including layer 23 and the active material-containing layer 20b tends to be enhanced. However, when the area ratio A2 is too high, the movement of lithium ions and the like between the electrodes is hindered, which deteriorates the battery performance. Therefore, the area ratio A2 is preferably 10% or less, more preferably 5% or less, and still more preferably 3.5% or less. The area ratio A2 can be obtained in the same manner as the area ratio A1 by using the end portion of the active material-containing layer 20b as the measurement sample. The area ratio A2 is preferably higher than the area ratio A1.

The adhesion between the organic fibers-including layer 23 and the active material-containing layer 20b can be evaluated by, for example, a 180° peel adhesion test method specified in Japanese Industrial Standard JIS Z 0237: 2009 "adhesive tape and adhesive sheet test method".

Specifically, first, in the same manner as described above, the electrode structure is taken out and cut out so as to have the same breadth as the breadth of the adhesive tape to thereby obtain the measurement sample. Next, a portion of the measurement sample is cut off to obtain a test piece. As the test piece, one of both end portions of the active material-containing layer 20b in the long side direction may also be used, or the central portion of the active material-containing layer 20b may be used. Next, the adhesive tape is crimped onto the organic fibers-including layer 23 of the test piece and set in a tensile tester. Next, the organic fibers-including layer 23 is peeled off from the active material-containing layer 20b by pulling the adhesive tape. The length of the adhesive tape in the short side direction is, for example, 12 mm, and the length of the adhesive tape in the long side direction is, for example, 75 mm or more. A test speed is 5 mm/s, and an average value of the adhesion obtained by peeling the adhesive tape 25 mm is taken as the peel strength.

A peel strength obtained by this test can be used as an indicator of the adhesion between the organic fibers-including layer 23 and the active material-containing layer 20b. That is, as the peel strength is higher, the adhesion between the organic fibers-including layer 23 and the active material-containing layer 20b is higher, and the internal short circuit of the battery is less likely to occur. One example of peel strength is 5 mN/10 mm or more, and another example is 10 mN/10 mm or more. There is no particular upper limit to this peel strength, but according to one example, the upper limit is 300 mN/10 mm or less. The peel strength of the measurement sample collected from the end portion (first or second region) of the active material-containing layer 20b in the long side direction is preferably more than the peel strength of the measurement sample collected from the central portion (third region) of the active material-containing layer 20b.

The resin mass 232 preferably contains a binding point. The binding point is a portion of the resin mass 232 that is in direct contact with the active material-containing layer 20b. Since the binding point is firmly attached to the active material-containing layer 20b, the binding point remains on the main surface of the exposed active material-containing layer 20b after the organic fibers-including layer 23 is peeled off from the active material-containing layer 20b. When the resin mass 232 has such a binding point, the adhesion between the organic fibers-including layer 23 and the active material-containing layer 20b tends to be enhanced.

The breadth of the binding point is preferably 10 μm or more, more preferably 15 μm or more, and still more preferably 20 μm or more. When the breadth of the binding point is large, the adhesion between the organic fibers-including layer 23 and the active material-containing layer 20b tends to be high.

From the viewpoint of enhancing the performance of the secondary battery, the breadth of the binding point is preferably not too large. When the binding point is excessively large, the movement of lithium ions and the like between the electrodes is hindered, which deteriorates the battery performance. The breadth of the binding point is preferably 100 μm or less, and more preferably 50 μm or less.

The breadth of the binding point can be obtained in the same manner as the breadth B of the resin mass 232 by using the exposed active material-containing layer 20b after the above-described 180° peel adhesion test as the measurement sample. That is, after the 180° peel adhesion test, the particulate matter attached to the main surface of the active material-containing layer 20b, from which the organic fibers-including layer 23 is peeled, can be regarded as the binding point. Then, the circumscribed rectangles of the binding points are extracted, and the average value of those having a breadth of 10 μm or more can be used as the breadth of the binding point.

The binding points may be present in any one or more of the first to third regions. The binding points may be present in all of the first to third regions. In addition, the binding points may be present in the region between the position P1 and the position P2.

The binding points are preferably present in at least one of the first and second regions. That is, when the binding point is present at the end portion (first and second regions) of the active material-containing layer 20b in the long side direction, the internal short circuit of the secondary battery is less likely to occur, as compared with a case in which the binding point is present only in the central portion (third region) of the active material-containing layer.

In the central portion of the main surface of the active material-containing layer 20b, an area ratio A3 occupied by the area of the binding point is preferably 0.3% or more, and more preferably 0.8% or more. When the area ratio A3 is high, the adhesion between the organic fibers-including layer 23 and the active material-containing layer 20b tends to be further enhanced. However, when the area ratio A3 is too high, the movement of lithium ions and the like between the electrodes is hindered, which deteriorates the battery performance. Therefore, the area ratio A3 is preferably 10% or less, more preferably 5% or less, and still more preferably 3.5% or less.

The area ratio A3 can be obtained in the same manner as the area ratio A1 by using the exposed active material-containing layer 20b after the above-described 180° peel adhesion test as the measurement sample. That is, after the 180° peel adhesion test, the particulate matter attached to the main surface of the active material-containing layer 20b, from which the organic fibers-including layer 23 is peeled, can be regarded as the binding point. Then, the area ratio A3 can be calculated by calculating the total area of these.

In the end portion (first or second region) of the main surface of the active material-containing layer 20b, an area ratio A4 occupied by the area of the binding point is preferably 0.4% or more, more preferably 1.0% or more, and still more preferably 1.5% or more. When the area ratio A4 is high, the adhesion between the organic fibers-including layer 23 and the active material-containing layer 20b tends to be enhanced. However, when the area ratio A4 is too high, the movement of lithium ions and the like between the electrodes is hindered, which deteriorates the battery performance. Therefore, the area ratio A4 is preferably 10% or less, more preferably 5% or less, and still more preferably 3.5% or less. The area ratio A4 can be obtained in the same manner as the area ratio A3 by using the end portion of the active material-containing layer 20b as the measurement sample.

The resin mass 232 preferably contains an organic material capable of dissolving the organic fiber 231. The resin mass 232 may contain the same organic material as the organic fiber 231, and may contain an organic material different from the organic fiber 231. Examples of the resin mass 232 include at least one organic material selected from the group consisting of polyamide imide, polyamide, polyolefin, polyether, polyimide, polyketone, polysulfone, cellulose, polyvinyl alcohol (PVA), and polyvinylidene fluoride (PVdF).

Next, a modification of the organic fibers-including layer 23 will be described.

Figure 9:
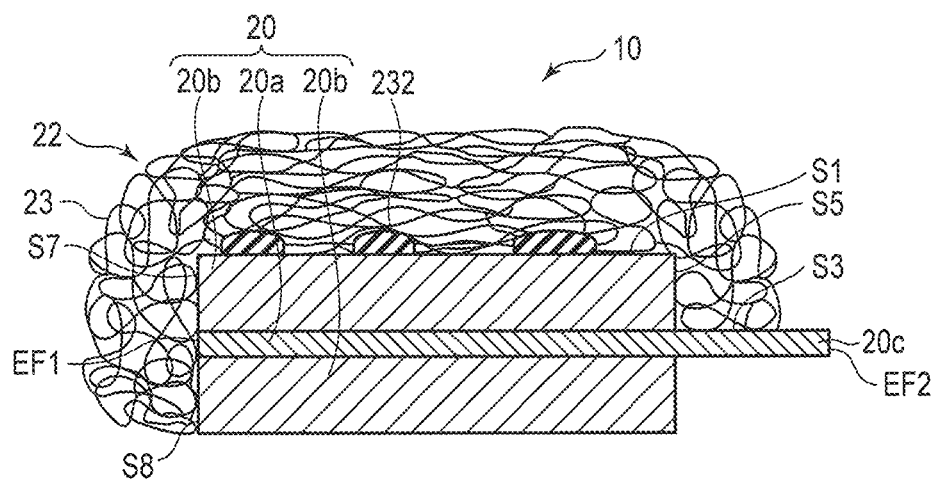
FIG. 9 is a cross-sectional view schematically showing a first modification of the organic fibers-including layer.

FIG. 9 is a cross-sectional view schematically showing a first modification of the organic fibers-including layer. The organic fibers-including layer 23 shown in FIG. 9 has the same structure as the organic fibers-including layer 23 shown in FIG. 1, except that the organic fibers-including layer 23 is further deposited on a first end face EF1 of a current collector 20a in a long side direction, side surfaces S7 and S8 of an active material-containing layer 20b on the first end face EF1 side of the current collector 20a, a side surface S5 of the active material-containing layer 20b on the second end face EF2 side of the current collector 20a, and a portion S3 of a main surface of a tab 20c. When the organic fibers-including layer 23 has such a structure, the adhesion between the organic fibers-including layer 23 and the active material-containing layer 20b is further enhanced, and the internal short circuit of the secondary battery tends to be suppressed.

Figure 10:
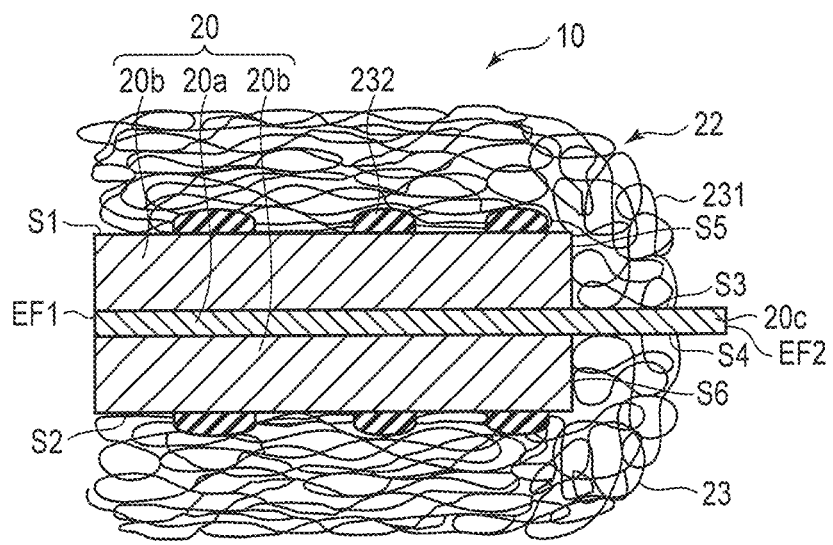
FIG. 10 is a cross-sectional view schematically showing a second modification of the organic fibers-including layer.

FIG. 10 is a cross-sectional view schematically showing a second modification of the organic fibers-including layer. The organic fibers-including layer 23 shown in FIG. 10 has the same structure as the organic fibers-including layer 23 shown in FIG. 1, except that the organic fibers-including layer 23 is further deposited on the other main surface S2 of the active material-containing layer 20b, side surfaces S5 and S6 of the active material-containing layer 20b on the second end face EF2 side of a current collector 20a, and portions S3 and S4 of the main surface of a tab 20c. The organic fibers-including layer 23 shown in FIG. 10 includes a resin mass 232 provided on the other main surface S2 of the active material-containing layer 20b. When the organic fibers-including layer 23 has such a structure, the adhesion between the organic fibers-including layer 23 and the active material-containing layer 20b is further enhanced, and the internal short circuit of the secondary battery tends to be suppressed. Note that the resin mass 232 may not be present on the main surface S2.

Figure 11:
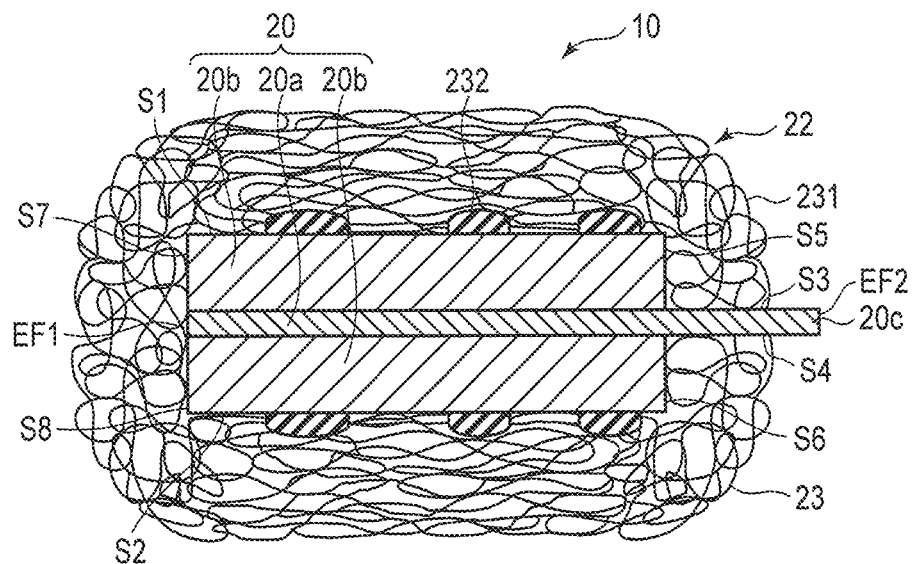
FIG. 11 is a cross-sectional view schematically showing a third modification of the organic fibers-including layer.

FIG. 11 is a cross-sectional view schematically showing a third modification of the organic fibers-including layer. The organic fibers-including layer 23 shown in FIG. 11 has the same structure as the organic fibers-including layer 23 shown in FIG. 10, except that the organic fibers-including layer 23 is further deposited on a first end face EF1 of a current collector 20a, and side surfaces S7 and S8 of an active material-containing layer 20b on the first end face EF1 side of the current collector 20a. When the organic fibers-including layer 23 has such a structure, the adhesion between the organic fibers-including layer 23 and the active material-containing layer 20b is further enhanced, and the internal short circuit of the secondary battery tends to be suppressed.

(Intermediate Layer)

The electrode structure according to one embodiment may include an intermediate layer. The intermediate layer is provided between the organic fibers-including layer and the active material-containing layer. The intermediate layer is insulating. The intermediate layer preferably has conductivity of an alkali metal ion such as lithium ion.

In the electrode structure according to one embodiment, when the intermediate layer is provided between the organic fibers-including layer and the active material-containing layer, the internal short circuit of the secondary battery can be less likely to occur. That is, the intermediate layer can serve as a separator together with the organic fibers-including layer deposited on the intermediate layer. Therefore, even when a portion of the organic fibers-including layer is peeled off from the intermediate layer, the insulation property is maintained and the internal short circuit of the secondary battery is less likely to occur.

The intermediate layer may cover a portion of the main surface of the active material-containing layer, or may cover the entire main surface of the active material-containing layer. In addition, the intermediate layer may also cover at least a portion of the side surface adjacent to the main surface of the active material-containing layer.

When the electrode structure includes the intermediate layer, the resin mass is preferably in direct contact with the intermediate layer. The same effect as that of the embodiment in which the resin mass is in contact with the main surface of the active material-containing layer can be obtained by contacting the resin mass with the intermediate layer covering at least a portion of the main surface of the active material-containing layer.

The intermediate layer contains, for example, an inorganic material. Examples of the inorganic material can include oxide (for example, oxide of group IIA to VA, transition metals, IIIB and IVB, such as $Li_2O$, BeO, $B_2O_3$, $Na_2O$, MgO, $Al_2O_3$, $SiO_2$, $P_2O_5$, CaO, $Cr_2O_3$, $Fe_2O_3$, ZnO, $ZrO_2$, $TiO_2$, magnesium oxide, silicon oxide, alumina, zirconia, and titanium oxide), zeolite ($M_{2/n}$ $O.Al_2O_3.xSiO_2.yH_2O$ (in the formula, M is a metal atom such as Na, K, Ca, and Ba, n is a number corresponding to the charge of a metal cation $Mn^+$, and x and y are the number of moles of $SiO_2$ and $H_2O$, $2 \leq x \leq 10$, $2 \leq y$), nitride (for example, BN, AlN, $Si_3N_4$, $Ba_3N_2$, or the like), slicon carbide (SiC), zircon ($ZrSiO_4$), carbonate (for example, $MgCO_3$ and $CaCO_3$, or the like), sulfate (for example, $CaSO_4$ and $BaSO_4$, or the like), and composites thereof (for example, steatite ($MgO.SiO_2$), forsterite ($2MgO.SiO_2$), and cordierite ($2MgO.2Al_2O_3.5SiO_2$) which are one type of porcelain), tungsten oxide, or mixtures thereof.

Examples of the other inorganic materials include barium titanate, calcium titanate, lead titanate, $\gamma$-$LiAlO_2$, $LiTiO_3$, or mixtures thereof. The intermediate layer preferably contains alumina.

The form of the inorganic material is, for example, granular or fibrous. An average particle size D50 of the inorganic material is, for example, 0.5 μm to 2 μm.

The intermediate layer may contain, in addition to the inorganic material, an additive such as a binder. Examples of the binder include carboxymethyl cellulose, polyvinylidene fluoride, polyimide, polyamideimide, styrene butadiene copolymer, and acrylic synthetic resin.

The proportion of the inorganic material in the intermediate layer is preferably 50 mass % to 95 mass %.

The thickness of the intermediate layer is, for example, 0.2 μm to 40 μm.

This intermediate layer can be provided by, for example, depositing an inorganic material on the active material-containing layer by sputtering or chemical vapor deposition (CVD). The intermediate layer may be provided by applying a slurry containing an inorganic material on the active material-containing layer, and drying it.

Figure 12:
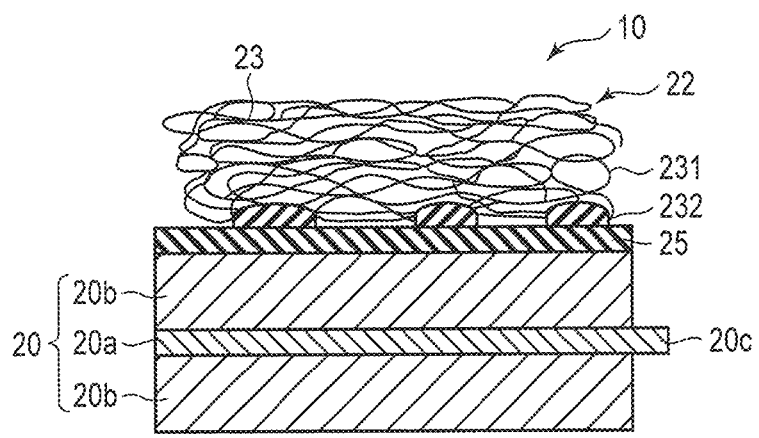
FIG. 12 is a cross-sectional view showing another example of the electrode structure according to one embodiment.

FIG. 12 is a cross-sectional view showing another example of the electrode structure according to one embodiment. The electrode structure 10 shown in FIG. 12 has the same as the electrode structure shown in FIG. 1, except that the intermediate layer 25 is provided between a negative electrode active material-containing layer 20b and an organic fibers-including layer 23. In the electrode structure 10 shown in FIG. 12, the intermediate layer 25 covers one main surface of the negative electrode active material-containing layer 20b. In addition, the resin mass 232 is deposited on the intermediate layer 25.

(Manufacturing Method)

Next, an example of a method of manufacturing an electrode structure according to an embodiment will be described.

First, the electrode 20 shown in FIG. 1 is prepared. Specifically, a slurry containing an active material, conductive agent, and a binder is prepared. Next, the obtained slurry is applied to at least one main surface of the current collector 20a and dried to form the active material-containing layer 20b. Next, the active material-containing layer 20b is subjected to a press process and cut into desired dimensions as necessary. In addition, the slurry is not applied to a portion of the current collector 20a, and this portion is used as the tab 20c. As described above, the electrode 20 shown in FIG. 1 is obtained.

Figure 13:
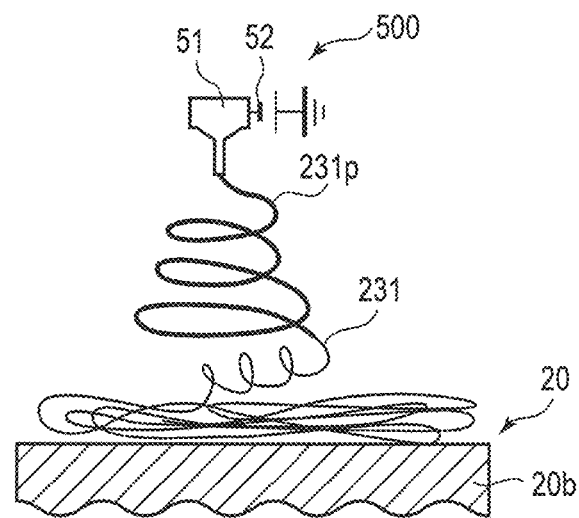
FIG. 13 is a cross-sectional view schematically showing a state in which an electrospray device discharges a thread-shaped raw material solution.
Figure 14:
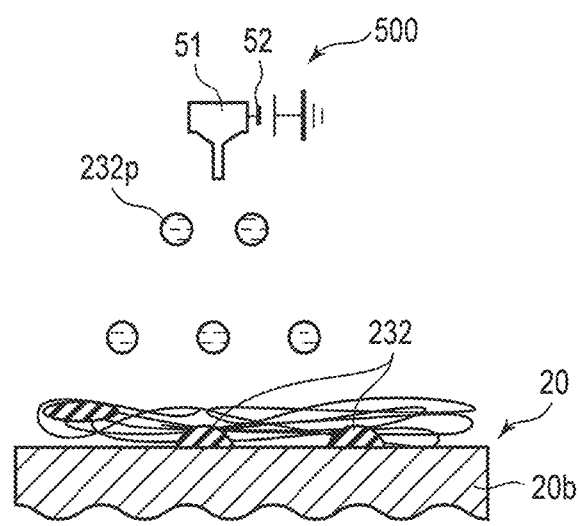
FIG. 14 is a cross-sectional view schematically showing a state in which an electrospray device discharges droplets.

Next, the organic fibers-including layer 23 is formed on the active material-containing layer 20b by, for example, combining an electrospinning method and an electrospray deposition method. This method will be described in detail with reference to FIGS. 13 and 14. FIG. 13 is a cross-sectional view schematically showing a state in which an electrospray device discharges a thread-shaped raw material solution. FIG. 14 is a cross-sectional view schematically showing a state in which an electrospray device discharges droplets.

When the organic fibers-including layer 23 is formed, first, a raw material solution is prepared. The raw material solution is prepared by dissolving an organic material in a solvent. Examples of the organic material may be the same as those described for the organic material constituting the organic fiber 231 or the resin mass 232. As the solvent, those capable of dissolving the organic material can be used. Examples of the solvent include N-methylpyrrolidone (NMP), dimethylacetamide (DMAc), dimethyl sulfoxide (DMSO), N,N-dimethylformamide (DMF), water, and alcohols. The concentration of the organic material in the raw material solution is preferably 5 mass % to 60 mass %.

Then, the electrospray device 500 shown in FIGS. 13 and 14 is prepared. The electrospray device 500 includes a spinning nozzle 51, a high voltage generator 52 applying a voltage to the spinning nozzle 51, a metering pump supplying the raw material solution to the spinning nozzle 51, and a tank storing the raw material solution. The metering pump and the tank are not shown. In addition, as the electrode facing the spinning nozzle 51, the electrode 20 obtained by the above-described method can be used. The spinning nozzle 51 may be a single nozzle or a multi-nozzle.

Next, as shown in FIG. 13, a thread-shaped raw material solution 231p is discharged from the spinning nozzle 51 toward the surface of the electrode 20 while applying the voltage to the spinning nozzle 51 using the high voltage generator 52 by the electrospinning method. The discharged raw material solution 231p approaches the electrode 20 while drawing a spiral shape. At this time, the raw material solution 231p charged by the voltage applied to the spinning nozzle 51 is drawn from the spinning nozzle 51 toward the electrode 20. Therefore, since the surface area of the raw material solution 231p rapidly increases, the solvent is volatilized from the raw material solution 231p, and the charge amount per unit volume of the raw material solution 231p is increased. Therefore, when the raw material solution 231p discharged from the spinning nozzle 51 reaches the electrode 20, the raw material solution 231p is deposited on the electrode 20 as the nano-sized organic fiber 231 in a state in which the solvent is almost completely volatilized.

Here, since the charged organic fiber 231 is attracted to the oppositely charged electrode 20 by electrostatic force, the charged organic fiber 231 is deposited on the electrode 20 over a region wider than a discharge port of the spinning nozzle 51. In particular, since the current collector and the tab are more easily charged than the active material-containing layer, the organic fiber 231 is likely to be drawn onto the current collector and the tab.

The applied voltage is appropriately determined according to solvent/solute species, boiling point/vapor pressure curves of the solvent, solution concentration, temperature, nozzle shape, distance between the sample and the nozzle, and the like. For example, the applied voltage sets a potential difference between the nozzle and the work to 0.1 kV to 100 kV. The supply rate of the raw material solution is also appropriately determined according to a solution concentration, a solution viscosity, a temperature, a pressure, an applied voltage, a nozzle shape, and the like. When the spinning nozzle 51 is a syringe type, for example, the supply rate is set to 0.1 µl/min to 500 µl/min per nozzle. In addition, when the spinning nozzle 51 is a multi-nozzle or a slit, the supply rate is determined according to an opening area of the nozzle.

Next, as shown in FIG. 14, droplets 232p of the raw material solution are discharged from the spinning nozzle 51 toward the surface of the electrode 20 by the electrospray deposition method. The droplets 232p reach the surface of the electrode 20 in a state in which a solvent is contained. At this time, the organic fibers 231 that are in contact with the droplets 232p are dissolved again in the solvent of the droplets 232p and integrated with the droplets 232p. Thereafter, most of the solvent of the droplets 232p is volatilized, and the organic material remaining on the surface of the electrode 20 becomes a resin mass 232. In this manner, the organic fibers-including layer 23 containing the resin mass 232 can be obtained.

The switching from the electrospinning method to the electrospray deposition method can be performed by, for example, adjusting the supply rate of the raw material solution, the distance between the sample and the nozzle, and the like. That is, by temporarily increasing the supply rate of the raw material solution, it is possible to reduce the continuity of the discharge of the raw material solution and to discharge the droplets 232p. In addition, by shortening the distance between the sample and nozzle, it is also possible to reduce the discharge space of the raw material solution and discharge the droplets 232p.

Alternatively, the electrospinning method can be switched to the electrospray deposition method by changing the kind of the raw material solution supplied to the spinning nozzle 51 of the electrospray device 500. That is, when changing from a raw material solution with low surface tension or low solvent boiling point to a raw material solution with high surface tension or high solvent boiling point, the continuity of the raw material solution discharged from the spinning nozzle 51 of the electrospray device 500 is reduced, and the droplets 232p can be discharged. The surface tension of the raw material solution can be relatively increased by, for example, lowering the solid concentration, viscosity, electrical conductivity, and the like.

Alternatively, by adjusting the supply rate of the raw material solution, the surface tension of the raw material solution, the boiling point of the solvent, or the like, it is also possible to be set such that discharging of the raw material solution is interrupted in the middle of the electrospinning method and the droplets 232p are discharged. In this case, it is possible to switch from the electrospinning method to the electrospray deposition method without changing the electrospray device 500 or changing the kind of the raw material solution to be supplied.

The deposition of the organic fibers 231 by the electrospinning method and the deposition of the resin mass 232 by the electrospray deposition method may be alternately repeated.

In addition, when using the multi-nozzle as the spinning nozzle 51, the discharge of the thread-shaped raw material solution 231p and the discharge of the droplets 232p can be performed simultaneously by making the supply rate of the raw material solution to some nozzles different from that of the other nozzles, or making the kind of the raw material solution supplied to some nozzles different from that of the other nozzles.

The breadth B and the area ratio A1 of the resin mass 232 can be adjusted by the kind of the organic material, the molecular weight of the organic material, the solid content concentration, the kind of the solvent, and the additive, and the like. In addition, the breadth and the area ratio A3 of the binding point can be adjusted by the viscosity of the raw material solution, the electrical conductivity of the raw material solution, the surface tension of the raw material solution, the supply rate of the raw material solution, the kind of the spinning nozzle 51, the distance between the spinning nozzle 51 and the electrode 20, the applied voltage, the potential of the electrode 20, the transport speed, the chamber temperature, the chamber humidity, the chamber exhaust speed, the mass of the organic fibers-including layer per unit area, the film thickness of the organic fibers-including layer, the arrangement of the nozzles for droplet application, and the like. In addition, the region in which the resin mass 232 and the binding point are deposited on the electrode 20 can be adjusted by the arrangement of the spinning nozzle 51, the distance between the spinning nozzle 51 and the electrode 20, the applied voltage, the potential of the electrode 20, the transport speed, and the like.

Next, the press processing may be performed on the laminate of the electrode 20 and the organic fibers-including layer 23 formed as described above. As the press processing method, a roll press or a flat plate press may be used. The press processing temperature is, for example, 20° C. to 200° C. In this press processing, a ratio t1/t0 of the thickness t1 of the laminate after press processing to the thickness t0 of the laminate before press processing, that is, a compression ratio is preferably in the range of 70% to 98%. A portion of the resin mass 232 can be buried in the main surface of the active material-containing layer 20b by performing the press processing on the laminate of the electrode 20 and the organic fibers-including layer 23. When this press processing is performed, the adhesion between the organic fibers-including layer 23 and the active material-containing layer 20b is enhanced, and the organic fibers-including layer 23 is less likely to be peeled off from the active material-containing layer 20b.

The electrode structure obtained as described above can be roll-conveyed and wound on a reel. At the time of this roll conveyance, a portion of the organic fibers-including layer may be peeled off from the active material-containing layer by the contact with the roll. In particular, the peeling is likely to occur in the roll conveyance before the press processing.

Note that after the droplet discharge, the drying step may be provided to remove the solvent of the droplets and obtain the resin mass. It is possible to prevent organic fibers and droplets from adhering to the transport roll or the press roll by performing the drying step during or immediately after the step of forming the organic fibers-including layer and the resin mass.

Since the electrode structure according to one embodiment includes the organic fibers-including layer containing the resin mass, the peeling of the organic fibers-including layer due to the roll conveyance is less likely to occur. Therefore, when the electrode structure according to the first embodiment is used, the productivity of the electrode structure can be enhanced.

Here, the organic fibers-including layer 23 may include the particulate resin called beads. The beads are locally bulging portions of the string-shaped organic fibers 231. FIG. 15 is an electron microscope photograph showing an example of the organic fibers-including layer containing the bead. FIG. 16 is a cross-sectional view schematically showing an example of the bead. As shown in FIG. 15 and FIG. 16, the bead 233 is integrated with only one organic fiber 231a. In addition, as shown in FIG. 15 and FIG. 16, the bead 233 is not integrated with the surrounding organic fiber 231b. In FIG. 15 and FIG. 16, a part surrounded by a solid line is a boundary part between the bead 233 and the organic fiber 231a. In FIG. 15, a part surrounded by a dashed line is a boundary part between the bead 233 and the organic fiber 231b.

The breadth of the bead 233 is typically less than 10 μm. The breadth of the bead 233 can be calculated in the same manner as the breadth B of the resin mass 232.

The bead 233 typically does not contact the active material-containing layer 20b. The bead 233 may come into contact with the active material-containing layer 20b, but the effect of enhancing the adhesion between the organic fibers-including layer 23 and the active material-containing layer 20b is low. This is because the bead 233 does not come into contact with the active material-containing layer 20b in a state in which the solvent is contained. This will be described in detail with reference to FIG. 17.

Figure 17:
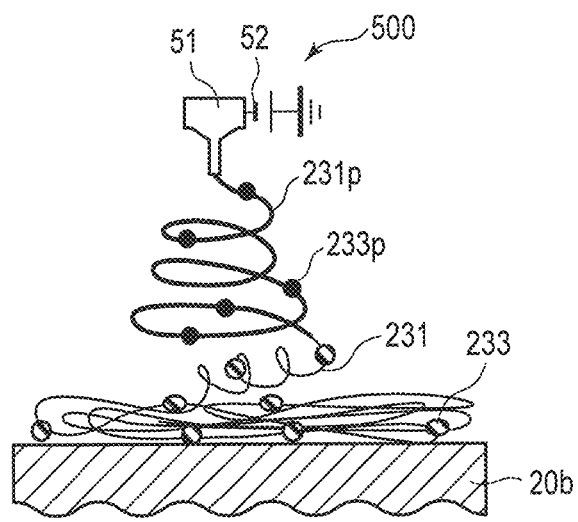
FIG. 17 is a cross-sectional view schematically showing a state in which an electrospray device discharges a raw material solution containing a particulate portion.

FIG. 17 is a cross-sectional view schematically showing a state in which an electrospray device discharges a raw material solution containing a particulate portion. As shown in FIG. 17, when a large amount of the raw material solution is locally discharged in the process of forming the organic fiber 231, a particulate portion 233p that is continuously connected to the thread-shaped raw material solution 231p is formed. Then, the solvent contained in the thread-shaped raw material solution 231p and the particulate portion 233p is almost completely evaporated before reaching the surface of the electrode 20. Therefore, the organic fiber 231 and the bead 233 that do not substantially contain the solvent are deposited on the electrode 20. Since the bead 233 does not substantially contain the solvent, the bead 233 is deposited on the organic fiber 231 without re-dissolving the organic fiber 231 deposited on the active material-containing layer 20b.

That is, even when the organic fiber 231 includes a portion of the bead 233, the contact area between the active material-containing layer 20b and the organic fibers-including layer 23 does not increase as much as the resin mass 232. Therefore, even when the organic fiber 231 contains the bead 233, the effect of enhancing the adhesion between the organic fibers-including layer 23 and the active material-containing layer 20b is low, and the effect of reducing the internal short circuit of the secondary battery is also low.

The organic fibers-including layer contained in the electrode structure according to the first embodiment may or may not contain the bead.

The above-described electrode structure according to the first embodiment includes the organic fibers-including layer containing the resin mass. Therefore, when the electrode structure according to the first embodiment is used, the internal short circuit of the secondary battery can be suppressed.

Second Embodiment

According to a second embodiment, there is provided a secondary battery including the electrode structure according to the first embodiment, a counter electrode, and an electrolyte.

The electrode structure and the counter electrode can constitute an electrode group. The electrolyte is held in the electrode group. Note that the secondary battery according to the second embodiment may further include a self-supporting film type separator disposed between the electrode structure and the counter electrode.

In addition, the secondary battery according to the second embodiment can further include a container member that accommodates the electrode group and the electrolyte.

Furthermore, the secondary battery according to the second embodiment can further include a negative electrode terminal electrically connected to a negative electrode and a positive electrode terminal electrically connected to a positive electrode.

The secondary battery according to the second embodiment may be, for example, a lithium secondary battery. In addition, the secondary battery includes a nonaqueous electrolyte secondary battery containing a nonaqueous electrolyte.

Hereinafter, the counter electrode, the electrode group, the electrolyte, the self-supporting film type separator, and the container member will be described in detail.

(Counter Electrode)

The counter electrode faces the electrode structure according to the first embodiment. Hereinafter, the electrode included in the electrode structure according to the first embodiment will be described as a first electrode, and the counter electrode will be described as a second electrode.

When the first electrode is the negative electrode, the second electrode can be the positive electrode. When the first electrode is the positive electrode, the second electrode can be the negative electrode.

Similar to the first embodiment, the second electrode may be the electrode structure including an electrode-integrated separator. In this case, the first electrode and the second electrode may face each other through the separator, and the electrode and the separator may be alternatively arranged.

(Electrode Group)

Figure 18:
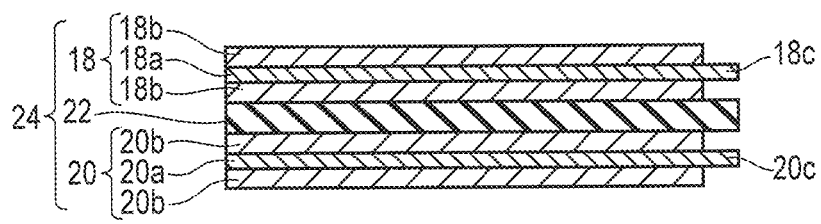
FIG. 18 is a cross-sectional view schematically showing an example of the electrode group.

FIG. 18 is a cross-sectional view schematically showing an example of the electrode group. The electrode group 24 shown in FIG. 18 includes a first electrode 20, a second electrode 18, and a separator 22. The first electrode 20 and the second electrode 18 face each other with the separator 22 interposed therebetween. The second electrode 18 includes a current collector 18a, active material-containing layers 18b provided on both surfaces of the current collector 18a, and a tab 18c that is a portion of the current collector 18a where the active material-containing layers 18b are not provided. The active material-containing layer 18b may be provided on one side of the current collector 18a. In the electrode group shown in FIG. 18, the tab 18c and the tab 20c protrude in the same direction.

Figure 19:
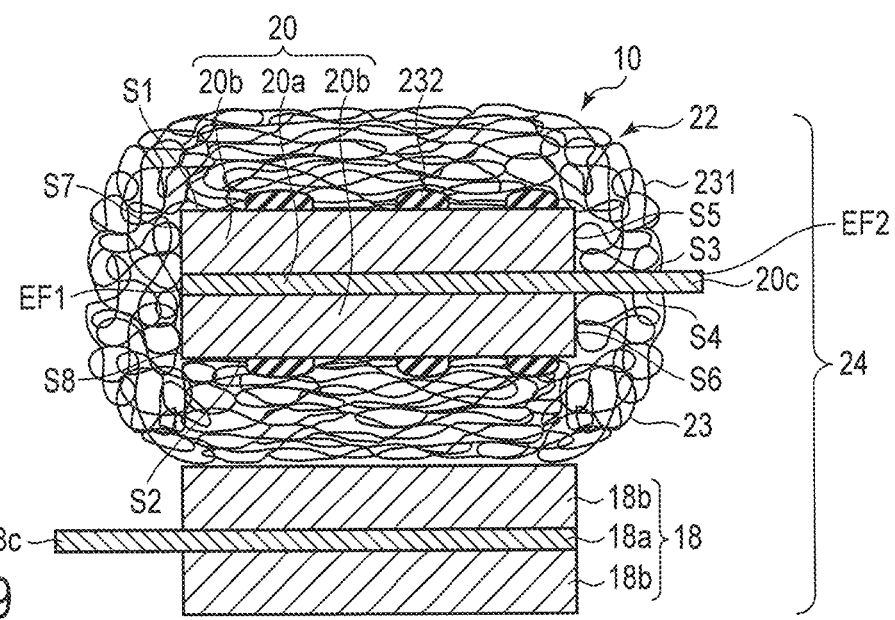
FIG. 19 is a cross-sectional view schematically showing another example of the electrode group.

FIG. 19 is a cross-sectional view schematically showing another example of the electrode group. The electrode group 24 shown in FIG. 19 includes the electrode structure 10 shown in FIG. 11 and a second electrode 18. The second electrode 18 is disposed such that the tab 18c protrudes from the side surface of the current collector 18a to the opposite side of the tab 20c of the first electrode 20. The first electrode structure 10 and the second electrode 18 face each other through the organic fibers-including layer 23 provided on the main surface S2 of the active material-containing layer 20b.

FIG. 20 is a cross-sectional view schematically showing still another example of the electrode group. The electrode group 24 shown in FIG. 20 includes the electrode structure 10 shown in FIG. 9 and a counter electrode structure 10a.

The counter electrode structure 10a has the same configuration as the electrode structure 10 shown in FIG. 9, except that a second electrode 18 is included instead of the first electrode 20. The counter electrode structure 10a is disposed such that the tab 18c protrudes from the side surface of the current collector 18a to the opposite side of the tab 20c of the first electrode 20. The electrode structure 10 and the counter electrode structure 10a face each other through the organic fibers-including layer 23 provided on the main surface S10 of the active material-containing layer 18b of the counter electrode structure 10a.

(Electrolyte)

A nonaqueous electrolyte can be used as the electrolyte. Examples of the nonaqueous electrolyte include a liquid nonaqueous electrolyte prepared by dissolving an electrolyte salt in an organic solvent, a gel-form nonaqueous electrolyte in which a liquid electrolyte and a polymer material are combined, and the like. The liquid nonaqueous electrolyte can be prepared by, for example, dissolving an electrolyte salt in an organic solvent at a concentration of 0.5 mol/L to 2.5 mol/L.

Examples of the electrolyte salt can include a lithium salt such as lithium perchlorate ($LiClO_4$), lithium hexafluorophosphate ($LiPF_6$), lithium tetrafluoroborate ($LiBF_4$), lithium arsenic hexafluoride ($LiAsF_6$), lithium trifluoromethanesulfonate ($LiCF_3SO_3$), or bistrifluoromethylsulfonylimide lithium [$LiN(CF_3SO_2)_2$], and mixtures thereof. As the electrolyte salt, those difficult to be oxidized even at a high potential are preferable, and $LiPF_6$ is most preferable.

Examples of the organic solvent include cyclic carbonates such as propylene carbonate (PC), ethylene carbonate (EC), and vinylene carbonate, chain carbonates such as diethyl carbonate (DEC), dimethyl carbonate (DMC), and methyl ethyl carbonate (MEC), cyclic ethers such as tetrahydrofuran (THF), 2 methyl tetrahydrofuran (2MeTHF), and dioxolane (DOX), chain ethers such as dimethoxy ethane (DME) and diethoxy ethane (DEE), γ-butyrolactone (GBL), acetonitrile (AN), and sulfolane (SL). These organic solvents can be used alone or can be used as a mixture of two or more kinds.

Examples of the polymer material can include polyvinylidene fluoride (PVdF), polyacrylonitrile (PAN), polyethylene oxide (PEO), or mixtures thereof.

As the nonaqueous electrolyte, an room temperature molten salt (ionic melt) containing lithium ions, a polymer solid electrolyte, an inorganic solid electrolyte, or the like may be used.

(Container Member)

As the container member, for example, a metal container, a container made of a laminate film, or the like can be used.

FIG. 21 is an exploded perspective view showing an example of a secondary battery according to one embodiment. FIG. 21 is a view showing an example of a secondary battery using a rectangular metal container as a container member. The secondary battery 100 shown in FIG. 21 includes a container member 30, a wound electrode group 24, a lid 32, a positive electrode terminal 33, a negative electrode terminal 34, a nonaqueous electrolyte (not shown), a positive electrode lead 38, and a negative electrode lead 39. The wound electrode group 24 has a structure in which a first electrode 20, a separator 22, and a second electrode 18 are wound in a flat spiral shape. Hereinafter, the first electrode 20 is described as a negative electrode, and the second electrode 18 is described as a positive electrode.

In the wound electrode group 24, a flat spirally wound positive electrode tab (not shown) is positioned on one circumferential end surface, and a flat spirally wound negative electrode tab 20c is positioned on the other end surface. The nonaqueous electrolyte is held or impregnated in the electrode group 24. The positive electrode lead 38 is electrically connected to the positive electrode tab and electrically connected to the positive electrode terminal 33. In addition, the negative electrode lead 39 is electrically connected to the negative electrode tab 20c and electrically connected to the negative electrode terminal 34. The electrode group 24 is disposed in the container member 30 such that the positive electrode lead 38 and the negative electrode lead 39 face the main surface side of the container member 30. The lid 32 is fixed to an opening of the container member 30 by welding or the like. The positive electrode terminal 33 and the negative electrode terminal 34 are respectively attached to the lid 32 through an insulating hermetic seal member (not shown).

Figure 22:
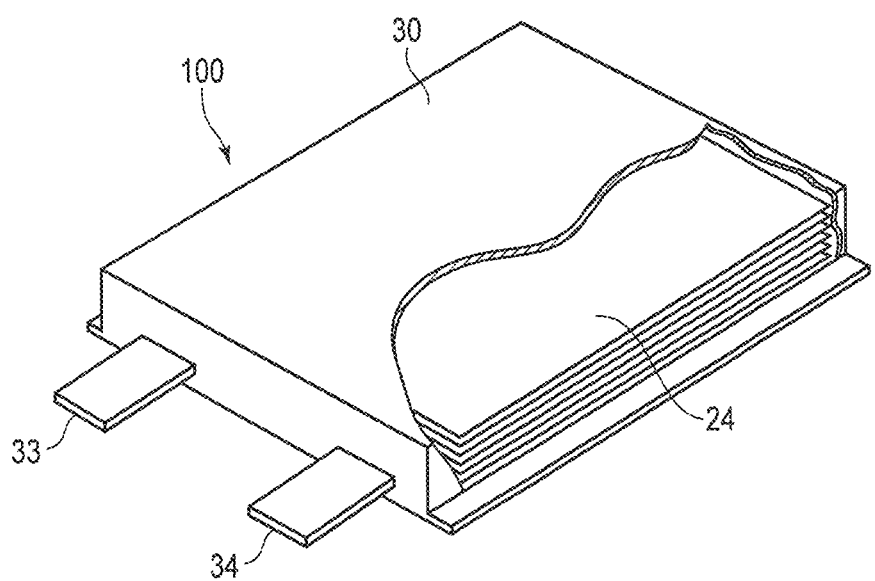
FIG. 22 is a partial cutaway perspective view showing another example of the secondary battery according to one embodiment.

FIG. 22 is a partial cutaway perspective view showing another example of the secondary battery according to one embodiment. FIG. 22 is a view showing an example of a secondary battery using a laminate film as a container member. The secondary battery 100 shown in FIG. 22 includes a container member 30 made of a laminated film, an electrode group 24, a positive electrode terminal 33, a negative electrode terminal 34, and a nonaqueous electrolyte (not illustrated). The electrode group 24 has a stacked structure in which the positive electrode 18 and the negative electrode 20 are alternately stacked through the separator 22. The nonaqueous electrolyte (not shown) is held or impregnated in the electrode group 24. The positive electrode tab of each positive electrode 18 is electrically connected to the positive electrode terminal 33, and the negative electrode tab of each negative electrode 20 is electrically connected to the negative electrode terminal 34. As shown in FIG. 19, the tips of the positive electrode terminal 33 and the negative electrode terminal 34 protrude to the outside of the container member 30 with a distance from each other.

The secondary battery according to the second embodiment includes the electrode structure according to the first embodiment. Therefore, the secondary battery according to the second embodiment is less likely to cause the internal short circuit.

EXAMPLES

Comparative Example 1

(Production of Negative Electrode)

As a negative electrode, an electrode provided with a negative electrode active material-containing layer on both sides of a current collector was prepared. An aluminum foil was used as the current collector. As the negative electrode active material, lithium titanate having a spinel structure was used. The average particle size of primary particles of the negative electrode active material was 1 μm. In addition, the negative electrode active material-containing layer was not formed at one end of the current collector in the long side direction, and this portion was used as a negative electrode tab. The length of the negative electrode active material-containing layer in the long side direction was 2 m, and the length of the short side was 0.1 m.

(Formation of Layer of Organic Fibers)

First, organic fibers were deposited on the negative electrode by electrospinning to obtain an organic fibers-including layer. Specifically, polyvinylidene fluoride (PVdF) was first dissolved in N-methyl-2-pyrrolidone (NMP) to prepare a raw material solution. The concentration of PVdF in the raw material solution was 20 mass %. Hereinafter, the raw material solution is referred to as a raw material solution LM1. The diameter of the organic fiber was 0.4 μm, the mass of the organic fibers-including layer per unit area was 3 g/m$^2$, and the thickness was 35 μm.

Next, the raw material solution was supplied from the spinning nozzle to the surface of the negative electrode at a supply rate of 500 μl/min by using a metering pump. As an electrospinning device, a single nozzle type electrospinning device was used. At this time, a voltage applied to the spinning nozzle by a high voltage generator was 30 kV. Note that the negative electrode structure of the structure shown in FIG. 8 was obtained by performing the electrospinning method in the state in which the surface of the negative electrode tab was masked, excluding the portion of 5 mm from the boundary of the side surface of the negative electrode active material-containing layer in the surfaces of the negative electrode tab. Hereinafter, the negative electrode structure is referred to as a negative electrode structure NE1.

Next, the negative electrode structure NE1 was roll-conveyed and wound on the reel.

(Production of Positive Electrode)

As a positive electrode, an electrode provided with a positive electrode active material-containing layer was prepared on a current collector. An aluminum foil was used as the current collector. Lithium cobaltate was used as the positive electrode active material.

(Production of Electrolyte)

LiPF$_6$ was dissolved in a mixed solvent of diethyl carbonate (DEC) and ethyl methyl carbonate (EMC) to prepare a liquid electrolyte.

(Production of Secondary Battery)

First, the negative electrode structure NE1 and the positive electrode were disposed to face each other through the organic fibers-including layer. Next, these were wound in a flat shape to obtain a flat spiral electrode group. Then, the electrode group was vacuum-dried overnight at room temperature, and left in a glove box with a dew point of −80° C. or less for 1 day. Next, the electrode group after being left was housed in a metal container together with the liquid electrolyte to obtain a secondary battery.

Example 1

A deposit of organic fibers was provided on the negative electrode in the same manner as described in Comparative Example 1, except that the raw material solution LM1 was changed to the raw material solution LM2 and the diameter of the organic fiber was changed from 0.4 μm to 1.2 μm.

As the raw material solution LM2, a solution in which polyamide (PA) was dissolved in N,N-dimethylacetamide (DMAc) was used. The concentration of PA in the raw material solution was 20 mass %.

Next, droplets were applied to the deposit of organic fibers on the negative electrode by electrospray deposition to form a resin mass. Specifically, the raw material solution LM2 was supplied to an electrospray device, and droplets were applied to the deposit of organic fibers on the negative electrode. At this time, the supply rate of the raw material solution was 100 μl/min, and the distance between the spinning nozzle and the surface of the negative electrode active material-containing layer was 100 mm. Thus, a negative electrode structure was obtained. Hereinafter, the negative electrode structure is referred to as a negative electrode structure NE2. The mass of the organic fibers-including layer per unit area was 2 g/m² and the thickness of the organic fibers-including layer was 30 μm.

A secondary battery was obtained in the same manner as that described in Comparative Example 1, except that the negative electrode structure NE2 was used instead of the negative electrode structure NE1.

Example 2

First, polyimide (PI) was dissolved in DMAc to prepare a raw material solution. Hereinafter, the raw material solution is referred to as a raw material solution LM3. The concentration of the raw material solution LM3 was adjusted to be 30 mass %.

Next, an organic fibers-including layer containing a resin mass was formed by supplying the raw material solution LM3 to a multi-nozzle type electrospray device and discharging droplets from a nozzle whose liquid supply pressure is high and electric field strength at the tip is small. In the case of droplet application by the electrospray deposition method, the supply rate of the raw material solution was 3000 μl/min, and the distance between the spinning nozzle and the surface of the negative electrode active material layer was 100 mm. Thus, a negative electrode structure was obtained. Hereinafter, the negative electrode structure is referred to as a negative electrode structure NE3. Note that the diameter of the organic fiber was 0.9 μm, the basis weight of the organic fibers-including layer was 2 g/m², and the thickness was 30 μm.

A secondary battery was obtained in the same manner as that described in Comparative Example 1, except that the negative electrode structure NE3 was used instead of the negative electrode structure NE1.

Example 3

A positive electrode was obtained in the same manner as that described in Comparative Example 1, except that a material whose average particle size of primary particles was 3 μm was used as a positive electrode active material.

A positive electrode structure was obtained in the same manner as described in Example 2, except that the positive electrode was used instead of the negative electrode, and the supply rate of the raw material solution in the electrospray deposition method was changed from 3,000 μl/min to 5,000 μl/min. Hereinafter, the positive electrode structure is referred to as a positive electrode structure PE1.

A secondary battery was obtained in the same manner as described in Comparative Example 1, except that the positive electrode structure PE1 was used instead of the positive electrode, and the negative electrode was used instead of the negative electrode structure NE1.

Example 4

A negative electrode structure was obtained in the same manner as described in Example 2, except that the supply rate of the raw material solution in the electrospray deposition method was changed from 3,000 μl/min to 6,000 μl/min. Hereinafter, the negative electrode structure is referred to as a negative electrode structure NE5.

A secondary battery was obtained by the same method as that described in Comparative Example 1, except that the negative electrode structure NE5 was used instead of the negative electrode structure NE1.

Example 5

A negative electrode structure was obtained in the same manner as described in Example 2, except that the raw material solution LM4 was used instead of the raw material solution LM3, the diameter of the organic fiber was changed from 0.9 μm to 0.6 μm, the supply rate of the raw material solution in the electrospray deposition method was changed from 3,000 μl/min to 5,000 μl/min, and the thickness of the organic fibers-including layer was changed from 30 μm to 25 μm. Hereinafter, the negative electrode structure is referred to as a negative electrode structure NE6.

As the raw material solution LM4, a solution in which polyimide (PI) was dissolved in N,N-dimethylacetamide (DMAc) was used. The concentration of PI in the raw material solution was 20 mass %.

A secondary battery was obtained by the same method as that described in Comparative Example 1, except that the negative electrode structure NE6 was used instead of the negative electrode structure NE1.

Example 6

A negative electrode structure was obtained in the same manner as described in Example 2, except that the raw material solution LM5 was used instead of the raw material solution LM3, the supply rate of the raw material solution in the electrospray deposition method was changed from 3,000 μl/min to 2,000 μl/min, the diameter of the organic fiber was changed from 0.9 μm to 1.5 μm, the mass of the organic fibers-including layer per unit area was changed from 2 g/m² to 4 g/m², and the thickness of the organic fibers-including layer was changed from 30 μm to 40 μm. Hereinafter, the negative electrode structure is referred to as a negative electrode structure NE7.

As the raw material solution LM5, a solution in which polyamideimide (PAI) was dissolved in DMAc was used. The concentration of the raw material solution LM5 was adjusted to be 30 mass %.

A secondary battery was obtained in the same manner as that described in Comparative Example 1, except that the negative electrode structure NE7 was used instead of the negative electrode structure NE1.

Example 7

A negative electrode structure was obtained in the same manner as described in Example 2, except that the raw material solution LM6 was used instead of the raw material solution LM3, the supply rate of the raw material solution in the electrospray deposition method was changed from 3,000 μl/min to 5,000 μl/min, the mass of the organic fibers-including layer per unit area was changed from 2 g/m² to 1 g/m², and the thickness of the organic fibers-including layer was changed from 30 μm to 20 μm. Hereinafter, the negative electrode structure is referred to as a negative electrode structure NE12.

As the raw material solution LM6, a solution in which polyamideimide (PAT) was dissolved in DMAc was used. The concentration of the raw material solution LM6 was adjusted to 20 mass %.

A secondary battery was obtained in the same manner as that described in Comparative Example 1, except that the negative electrode structure NE12 was used instead of the negative electrode structure NE1.

Example 8

A negative electrode structure was obtained in the same manner as described in Example 2, except that the raw material solution LM4 was used instead of the raw material solution LM3, the supply rate of the raw material solution in the electrospray deposition method was changed from 3,000 µl/min to 5,000 µl/min, the distance between the discharge nozzle of the spinning nozzle and the negative electrode was changed from 100 mm to 120 mm, the diameter of the organic fiber was changed from 0.9 µm to 0.6 µm, the mass of the organic fibers-including layer per unit area was changed from 2 g/m$^2$ to 1 g/m$^2$, and the thickness of the organic fibers-including layer was changed from 30 µm to 20 µm. Hereinafter, the negative electrode structure is referred to as a negative electrode structure NE8.

A secondary battery was obtained by the same method as that described in Comparative Example 1, except that the negative electrode structure NE8 was used instead of the negative electrode structure NE1.

Example 9

First, the negative electrode structure NE8 was pressed. Hereinafter, the negative electrode structure is referred to as a negative electrode structure NE9. At the time of the press process, the press temperature was 80° C. In addition, the thickness of the organic fibers-including layer after the pressing was 3 µm.

A secondary battery was obtained by the same method as that described in Comparative Example 1, except that the negative electrode structure NE9 was used instead of the negative electrode structure NE1.

Example 10

First, a negative electrode was obtained in the same manner as described in Comparative Example 1.

Next, 100 parts by mass of Al$_2$O$_3$ particles having an average particle size of 0.8 µm as an inorganic material, 1 part by mass of carboxymethylcellulose (CMC), and 4 parts by mass of acrylic binder was dispersed in water to prepare a slurry.

Next, the slurry was applied over the entire main surface of the negative electrode active material-containing layer. Next, the negative electrode coated with the slurry was dried to obtain an intermediate layer provided on the negative electrode active material-containing layer.

A negative electrode structure was obtained in the same manner as described in Example 8, except that the organic fibers-including layer was provided on this intermediate layer, and the mass of the organic fibers-including layer per unit area was changed from 1 g/m$^2$ to 2 g/m$^2$. Hereinafter, the negative electrode structure is referred to as a negative electrode structure NE10.

A secondary battery was obtained by the same method as that described in Comparative Example 1, except that the negative electrode structure NE10 was used instead of the negative electrode structure NE1.

Comparative Example 2

A negative electrode structure was obtained in the same manner as described in Example 2, except that a single nozzle type electrospray device was used, the raw material solution LM3 was used instead of the raw material solution LM1, the supply rate of the raw material solution was changed from 3,000 µl/min to 50 µl/min, the diameter of the organic fiber was changed from 0.9 µm to 0.6 µm, the thickness of the organic fibers-including layer was changed from 30 µm to 40 µm, the distance between the discharge port of the spinning nozzle and the negative electrode was changed from 100 mm to 150 mm, and the application of droplets by the electrospray deposition method was omitted. Hereinafter, the negative electrode structure is referred to as a negative electrode structure NE11.

As the raw material solution LM3, a solution in which PI was dissolved in DMAc was used. The concentration of the raw material solution LM3 was adjusted to be 30 mass %.

A secondary battery was obtained in the same manner as that described in Comparative Example 1, except that the negative electrode structure NE11 was used instead of the negative electrode structure NE1.

<Performance Evaluation>

(Measurement of Breadth of Resin Mass)

Regarding the positive electrode or negative electrode structures according to Examples 1 to 10, the breadth B of the resin mass was measured in the same manner as described above. The result is shown in Table 2.

(Measurement of Area Ratio of Resin Mass)

Regarding the positive electrode or negative electrode structures according to Examples 1 to 10, the area ratio A1 occupied by the area of the resin mass in the central portion of the main surface of the active material-containing layer and the area ratio A2 occupied by the area of the resin mass in the end portion of the main surface of the active material-containing layer were respectively calculated in the same manner as described above. The result is shown in Table 2.

(Measurement of Peel Strength of Layer of Organic Fibers)

Regarding the positive electrode or negative electrode structures according to Examples 1 to 10, Comparative Example 1, and Comparative Example 2, the peel strength of the organic fibers-including layer positioned at the central portion of the active material-containing layer and the peel strength of the organic fiber positioned at the end portion of the active material-containing layer were measured in the same manner as described above. The result is shown in Table 2.

(Measurement of Breadth of Binding Point)

Regarding the positive electrode or negative electrode structures according to Examples 1 to 10, the breadth B of the binding point was measured in the same manner as described above. The result is shown in Table 2.

(Measurement of Area Ratio of Binding Point)

Regarding the positive electrode or negative electrode structures according to Examples 1 to 10, the area ratio A3 occupied by the area of the binding point in the central portion of the main surface of the active material-containing layer and the area ratio A4 occupied by the area of the binding point in the end portion of the main surface of the active material-containing layer were respectively calculated in the same manner as described above. The result is shown in Table 2.

(Measurement of Electrode Exposure Area Ratio)

Regarding the positive electrode or negative electrode structures according to Examples 1 to 10 and Comparative Examples 1 and 2, the electrode exposure area ratio was measured in the same manner as described above. As a result, the electrode exposure area ratio was 0% in any positive electrode or negative electrode structure.

(Visual Evaluation)

Regarding the positive electrode or negative electrode structures according to Examples 1 to 10 and Comparative Examples 1 and 2, it was visually confirmed whether the organic fibers-including layer was peeled off at the time of roll conveyance and transferred to the conveyance roll.

The result is shown in Table 1.

(Evaluation of Charge-and-Discharge Performance) The charge-and-discharge curves were obtained for the secondary batteries according to Examples 1 to 10. Specifically, the battery was charged at a rate of 1 C until the SOC of the battery reached 100%, thereby obtaining a charge curve. In addition, the battery after charging was discharged at a rate of 1 C until the SOC of the battery became 0%, thereby obtaining a discharge curve. Note that the temperature at the time of charge and discharge was 25° C. As a result, good charge-and-discharge curves could be obtained in any of the secondary batteries.

The manufacturing conditions of the electrode structures according to Examples 1 to 10 and Comparative Examples 1 and 2 are summarized in Table 1 below.

In addition, in Table 1, in the lower row under the heading "organic fibers-including layer", a column with a notation "fiber diameter (μm)" describes the average diameter of the organic fibers. In addition, a column with a notation "mass per unit area (g/m²)" describes the mass of the organic fiber per unit area. In addition, a column with a notation "thickness (μm)" describes the thickness of the organic fibers-including layer.

TABLE 1

| | Raw material solution | | Electrospray deposition conditions | | | organic fibers-including layer | | | | | Transfer |
|---|---|---|---|---|---|---|---|---|---|---|---|
| | Organic material | Concentration (mass %) | Spinning nozzle | Solution supply rate (μm/min) | Nozzle-electrode distance (mm) | Fiber diameter (μm) | mass per unit area (g/m²) | Thickness (μm) | Intermediate layer | Press process | to conveyance roll |
| Comparative Example 1 | PVdF | 20 | — | — | — | 0.4 | 3 | 35 | Absent | Absent | Present |
| Example 1 | PA | 20 | Single nozzle type | 100 | 100 | 1.2 | 2 | 30 | Absent | Absent | Absent |
| Example 2 | PI | 30 | Multi-nozzle type | 3000 | 100 | 0.9 | 2 | 30 | Absent | Absent | Absent |
| Example 3 | PI | 30 | Multi-nozzle type | 5000 | 100 | 0.9 | 2 | 30 | Absent | Absent | Absent |
| Example 4 | PI | 30 | Multi-nozzle type | 6000 | 100 | 0.9 | 2 | 30 | Absent | Absent | Absent |
| Example 5 | PI | 20 | Multi-nozzle type | 5000 | 100 | 0.6 | 2 | 25 | Absent | Absent | Absent |
| Example 6 | PAI | 30 | Multi-nozzle type | 2000 | 100 | 1.5 | 4 | 40 | Absent | Absent | Absent |
| Example 7 | PAI | 20 | Multi-nozzle type | 5000 | 100 | 0.9 | 1 | 20 | Absent | Absent | Absent |
| Example 8 | PI | 20 | Multi-nozzle type | 5000 | 120 | 0.6 | 1 | 20 | Absent | Absent | Absent |
| Example 9 | PI | 20 | Multi-nozzle type | 5000 | 120 | 0.6 | 1 | 3 | Absent | Present | Absent |
| Example 10 | PI | 20 | Multi-nozzle type | 5000 | 120 | 0.6 | 2 | 20 | Present | Absent | Absent |
| Comparative Example 2 | PI | 30 | — | — | — | 0.6 | 2 | 40 | Absent | Absent | Present |

In Table 1, in the columns under the heading "raw material solution", a column with a notation "organic material" describes the kind of the organic material. A column with a notation "concentration (mass %)" describes the concentration of solids relative to the solution.

In addition, in Table 1, in the lower row under the heading "electrospray deposition conditions", a column with a notation "spinning nozzle" describes the kind of the spinning nozzles. A column with a notation "solution supply rate (μm/min)" describes the supply rate of the raw material solution. A column with a notation "nozzle-electrode distance (mm)" describes the distance between the discharge port of the spinning nozzle of each example and the surface of the active material-containing layer.

In addition, in Table 1, a column with a notation "intermediate layer" describes whether the electrode structure includes the intermediate layer. A column with a notation "press process" describes whether the press process has been performed on the electrode structure. A row with a notation "transfer to conveyance roll" describes whether there was an organic fibers-including layer transferred to the conveyance roll when the electrode structure was roll-conveyed.

The characteristics of the organic fibers-including layer obtained in each Example and Comparative Example and the performance of the secondary battery are summarized in Table 2 below.

TABLE 2

| | Resin mass | | | | Binding point | | | | Peel strength | | Secondary battery |
|---|---|---|---|---|---|---|---|---|---|---|---|
| | Presence/absence | Breadth (μm) | Area ratio A1 (%) | Area ratio A2 (%) | Presence/absence | Breadth (μm) | Area ratio A3 (%) | Area ratio A4 (%) | Central portion (mN/10 mm) | End portion (mN/10 mm) | Charge-and-discharge performance |
| Comparative Example 1 | Absent | — | — | — | Absent | — | — | — | 5.3 | 3.0 | — |
| Example 1 | Present | 45 | 1.8 | 1.5 | Present | 36 | 1.2 | 1 | 69 | 63 | Good |
| Example 2 | Present | 20 | 0.3 | 0.4 | Present | 32 | 0.2 | 0.3 | 6.3 | 37 | Good |

TABLE 2-continued

|  | Resin mass | | | | Binding point | | | | Peel strength | | Secondary battery |
|---|---|---|---|---|---|---|---|---|---|---|---|
|  | Presence/ absence | Breadth (μm) | Area ratio A1 (%) | Area ratio A2 (%) | Presence/ absence | Breadth (μm) | Area ratio A3 (%) | Area ratio A4 (%) | Central portion (mN/10 mm) | End portion (mN/10 mm) | Charge-and-discharge performance |
| Example 3 | Present | 25 | 1.3 | 3.3 | Present | 35 | 0.5 | — | — | — | Good |
| Example 4 | Present | 30 | 3.4 | — | Present | 35 | 2.2 | — | — | — | Good |
| Example 5 | Present | 30 | 0.9 | 2.1 | Present | 36 | 0.6 | — | — | — | Good |
| Example 6 | Present | 25 | 1.1 | — | Present | 15 | 0.4 | 0.4 | 25 | 25 | Good |
| Example 7 | Present | 15 | 4.0 | 6.0 | Present | 20 | 2 | — | Peeling impossible | Peeling impossible | Good |
| Example 8 | Present | 30 | 0.8 | 1.6 | Present | 34 | 0.5 | — | 42 | — | Good |
| Example 9 | Present | 35 | 0.8 | 1.6 | Present | 35 | 0.7 | — | 351 | — | Good |
| Example 10 | Present | 30 | 0.8 | 1.6 | Present | 40 | 0.3 | 0.7 | 12 | 31 | Good |
| Comparative Example 2 | Absent | — | — | — | Absent | — | 0 | 0 | — | — | — |

In Table 2, in the columns under the heading "resin mass", a column with a notation "presence/absence" describes whether the electrode structure has a resin mass. A column with a notation "breadth (μm)" describes the breadth B of the resin mass. A column with a notation "area ratio A1 (%)" describes the proportion of the area of the resin mass in the central portion of the main surface of the active material-containing layer. A column with a notation "area ratio A2 (%)" describes the proportion of the area of the resin mass in the end portion of the main surface of the active material-containing layer.

In addition, in Table 2, in the columns under the heading "binding point", a column with a notation "presence/absence" describes whether the negative electrode structure has a binding point. A column with a notation "breadth (μm)" describes the breadth of the binding point. A column with a notation "area ratio A3 (%)" describes the proportion of the area of the binding point in the central portion of the main surface of the active material-containing layer. A column with a notation "area ratio A4 (%)" describes the proportion of the area of the binding point in the end portion of the main surface of the active material-containing layer.

In addition, in Table 2, in the lower row under the heading "peel strength", a column with a notation "central portion (mN/10 mm)" describes the peel strength of the organic fibers-including layer positioned in the central portion of the active material-containing layer. In addition, a column with a notation "end portion (mN/10 mm)" describes the peel strength of the organic fiber positioned in the end portion of the active material-containing layer. Note that when the organic fibers-including layer was not able to be peeled off from the active material-containing layer by the adhesive tape, it is described as "peeling impossible".

In addition, in Table 2, a column with a notation "charge-and-discharge characteristics" under the heading "secondary battery" describes whether a good charge-and-discharge curve was obtained.

As apparent from Tables 1 and 2, in the electrode structures according to Examples 1 to 10, no peeling of the organic fibers-including layer was observed at the time of roll conveyance, and a good charge-and-discharge curve was obtained. On the other hand, in the electrode structures according to Comparative Examples 1 and 2, the peeling of the organic fibers-including layer was observed at the time of roll conveyance.

In addition, the electrode structure according to Example 9, on which the press process was performed, showed higher peeling strength, as compared with the electrode structure according to Example 8, on which the press process was not performed.

According to at least one embodiment described above, the electrode structure is provided. The electrode structure includes the organic fibers-including layer containing the resin mass. Therefore, when the electrode structure according to the embodiment is used, the internal short circuit of the secondary battery can be suppressed.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electrode structure, comprising;
an electrode comprising an active material-containing layer; and
a separator comprising a layer provided on a main surface of the active material-containing layer,
wherein the layer comprises organic fibers and a resin mass,
a thickness of the layer is 0.3 μm or more and 50 μm or less,
the resin mass is integrated with a portion of the organic fibers and comprises a binding point that is in direct contact with the active material-containing layer,
when a length of the resin mass is represented by a circumscribed quadrilateral of the resin mass, a length of a first side of the circumscribed quadrilateral and a length of a second side adjacent to the first side are each 10 μm or more,
the main surface of the active material-containing layer has a rectangular shape and comprises a first region, a second region, and a third region in the main surface of the active material-containing layer,
the first region is positioned at one end parallel to a long side direction of the main surface of the active material-containing layer and occupies a quarter area on the main surface of the active material-containing layer, the second region is positioned at an opposite end of the first region and occupies a quarter area on the main surface of the active material-containing layer, the third region is positioned between the first region and the second region and occupies a half area on the main surface of the active material-containing layer, the resin mass is positioned on at least one of the first region and the second region, and a ratio of an area of the resin mass in the first region or the second region of the active material-containing layer to a total area of the first region or the second region, respectively, is 0.4% or more.

2. The electrode structure according to claim 1, wherein the main surface of the active material-containing layer includes a concave portion and at least a portion of the resin mass is positioned in the concave portion.

3. The electrode structure according to claim 1, wherein the resin mass comprises at least one organic material selected from the group consisting of polyamide imide, polyamide, polyolefin, polyether, polyimide, polyketone, polysulfone, cellulose, polyvinyl alcohol, and polyvinylidene fluoride.

4. The electrode structure according to claim 1, wherein the organic fibers comprise at least one organic material selected from the group consisting of polyamide imide, polyamide, polyolefin, polyether, polyimide, polyketone, polysulfone, cellulose, polyvinyl alcohol, and polyvinylidene fluoride.

5. The electrode structure according to claim 1, wherein at least one of the length of the first side and the length of the second side is from 15 μm to 45 μm.

6. The electrode structure according to claim 1, wherein the active material-containing layer contains active material particles having an average particle size of 0.1 μm to 10 μm.

7. The electrode structure according to claim 1, further comprising an intermediate layer that is provided between the active material-containing layer and the separator and is insulating, wherein the resin mass is in contact with a portion of the main surface of the intermediate layer.

8. A secondary battery comprising:
the electrode structure according to claim 1;
an electrode facing the electrode structure; and
an electrolyte.

9. An electrode structure, comprising:
an electrode comprising an active material-containing layer; and
a separator comprising a layer provided on a main surface of the active material-containing layer,
wherein the layer comprises organic fibers and a resin mass,
a thickness of the layer is 0.3 μm or more and 50 μm or less,
the resin mass is integrated with a portion of the organic fibers and comprises a binding point that is in direct contact with the active material-containing layer,
when a length of the resin mass is represented by a circumscribed quadrilateral of the resin mass, a length of a first side of the circumscribed quadrilateral and a length of a second side adjacent to the first side are each 10 μm or more, the main surface of the active material-containing layer has a rectangular shape and comprises a first region, a second region, and a third region in the main surface of the active material-containing layer, the first region is positioned at one end parallel to a long side direction of the main surface of the active material-containing layer and occupies a quarter area on the main surface of the active material-containing layer, the second region is positioned at an opposite end of the first region and occupies a quarter area on the main surface of the active material-containing layer, the third region is positioned between the first region and the second region and occupies a half area on the main surface of the active material-containing layer, the resin mass is positioned on at least one of the first region and the second region, and the resin mass is further positioned on the third region, and a ratio of an area of the resin mass in the third region of the active material-containing layer to a total area of the third region is 0.3% or more.

10. The electrode structure according to claim 9, wherein the main surface of the active material-containing layer includes a concave portion and at least a portion of the resin mass is positioned in the concave portion.

11. The electrode structure according to claim 9, wherein the resin mass comprises at least one organic material selected from the group consisting of polyamide imide, polyamide, polyolefin, polyether, polyimide, polyketone, polysulfone, cellulose, polyvinyl alcohol, and polyvinylidene fluoride.

12. The electrode structure according to claim 9, wherein the organic fibers comprise at least one organic material selected from the group consisting of polyamide imide, polyamide, polyolefin, polyether, polyimide, polyketone, polysulfone, cellulose, polyvinyl alcohol, and polyvinylidene fluoride.

13. The electrode structure according to claim 9, wherein at least one of the length of the first side and the length of the second side is from 15 μm to 45 μm.

14. The electrode structure according to claim 9, wherein the active material-containing layer contains active material particles having an average particle size of 0.1 μm to 10 μm.

15. The electrode structure according to claim 9, further comprising an intermediate layer that is provided between the active material-containing layer and the separator and is insulating, wherein the resin mass is in contact with a portion of the main surface of the intermediate layer.

16. A secondary battery, comprising:
the electrode structure according to claim 9;
an electrode facing the electrode structure; and
an electrolyte.

* * * * *